United States Patent
Takaishi et al.

(10) Patent No.: US 6,989,956 B2
(45) Date of Patent: Jan. 24, 2006

(54) HEAD POSITION CONTROL METHOD, DISK DEVICE, AND SERVO TRACK WRITE METHOD

(75) Inventors: Kazuhiko Takaishi, Kawasaki (JP); Takeyori Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 86 days.

(21) Appl. No.: 10/452,116

(22) Filed: Jun. 2, 2003

(65) Prior Publication Data

US 2004/0004783 A1    Jan. 8, 2004

(30) Foreign Application Priority Data

Jul. 3, 2002    (JP)    ............... 2002-195037

(51) Int. Cl.
*G11B 5/596*    (2006.01)
(52) U.S. Cl. ..................... 360/77.04; 360/75
(58) Field of Classification Search ............ 360/77.04, 360/75, 78.04, 78.06, 78.07, 78.09, 78.14
See application file for complete search history.

(56) References Cited

U.S. PATENT DOCUMENTS

| | | | | |
|---|---|---|---|---|
| 3,725,764 A | * | 4/1973 | Oswald | 318/629 |
| 5,880,901 A | * | 3/1999 | Smith et al. | 360/77.04 |
| 6,137,753 A | * | 10/2000 | Grimsley | 360/75 |
| 6,545,838 B1 | * | 4/2003 | Burton | 360/78.06 |
| 6,728,061 B2 | * | 4/2004 | Takaishi | 360/77.04 |
| 2003/0063404 A1 | | 4/2003 | Takaishi et al. | 360/29 |

FOREIGN PATENT DOCUMENTS

| | | |
|---|---|---|
| JP | 08-195044 | 7/1996 |
| JP | 09-128915 | 5/1997 |
| JP | 09-330571 | 12/1997 |
| JP | 10-172254 | 6/1998 |
| JP | 2001-256741 | 9/2001 |

OTHER PUBLICATIONS

"Disk Runout Accomodation," Dec. 1978, IBM TDB vol. 21, No. 7, pp. 2688-2691.*
"Reducing RRO by Hybrid-type STW for Hard Disk Drives," Meeting Report of IIP2000, No. 00-10, The Japanese Society of Mechanical Engineers, no translation.

* cited by examiner

*Primary Examiner*—David Hudspeth
*Assistant Examiner*—James L Habermehl
(74) *Attorney, Agent, or Firm*—Greer, Burns & Crain, Ltd.

(57) ABSTRACT

A head position control method performs virtual circular control which does not follow the eccentricity of a disk, and implements high precision virtual circular control, even if the servo signals of an area demodulation method are used. The method performs virtual circular control by demodulating position signals in the area demodulation method and calculates the demodulation position with the velocity offset correction of 2-phase servo signals by using both the head velocity V of the virtual circular orbit reference and the relative velocity ΔV of the virtual circular orbit and the position signal.

14 Claims, 18 Drawing Sheets

Servo Mark
Gray Code
Index

PosA  PosB  PosC  PosD

| HEAD | S | C | |
|------|---|---|---|
| 0 | | | ~62 |
| 1 | | | |
| . . . . | | | |
| n | | | |

Servo Mark
Gray Code
Index

PosA  PosB  PosC  PosD

POSITION SENSITIVITY GAIN

PRIOR ART

HEAD POSITION CONTROL METHOD, DISK DEVICE, AND SERVO TRACK WRITE METHOD

BACKGROUND OF THE INVENTION

1. Field of the Invention

The present invention relates to a head position control method, a disk device and a servo track write method for positioning a head for recording/regenerating data on a disk on a target track of the disk, and more particularly to a head position control method, disk device and servo track write method for demodulating servo signals recorded on an eccentric disk and obtaining the position.

2. Description of the Related Art

The disk storage device which records or regenerates data to/from a rotating disk medium is widely used as a storage device for data. As FIG. 18 shows, the disk device is comprised of a disk 94 for storing data, a spindle motor 96 for rotating the disk 94, a head 90 for recording/regenerating information on the disk 94, and an actuator 92 for moving the head 90 to a target position. Typical of such a device is a magnetic disk (HDD: Hard Disk Drive) and an optical disk device (DVD-ROM, MO).

In the magnetic disk device, position signals 100 for detecting a position of the head 90 are recorded on the disk 94. The position signal 100 is comprised of a servo mark, track number and offset information. The current position of the head 90 can be obtained using the track number and offset information.

The difference between this position information and the target position is determined, and calculation is performed according to the position error amount, so as to supply the drive amount for driving the actuator 92, such as current in the case of a VCM (Voice Coil Motor), and voltage in the case of a piezo-electric actuator.

To record a servo signal (position signal) 100 on the disk 94, a method for recording the servo signal by an external STW (Servo Track Write) device has been proposed instead of a conventional STW method, where the disk device itself records the servo signal. For example, this method was proposed in the Japanese Patent Laid-Open No. 03-073406 "Servo information writing method for a magnetic disk device", (published on Mar. 28, 1991).

If the disk 94 for which STW was performed externally is mounted on an HDD device, eccentricity occurs, as shown in FIG. 19, and the position of the head 90 following up the position signal 100 oscillates in a sine wave manner along with the rotation of the disk 94. In other words, it is extremely difficult to set the disk 94 on the spindle motor 96 with perfectly matching the rotation center 94-1 when the position signals 100 are written on a circumference on the disk 94 with the axial center 98 of the spindle motor 96. Therefore the shift is occurred between the rotation center 94-1 and the axial center 98.

If the head follows up to this shift, that is to this eccentricity, the head is constantly oscillating (drive current is flowing), which increases power consumption and tends to make the operation to switch the head unstable. To solve this problem, methods for controlling the actuator without following up the eccentricity have been proposed. For example, a method has been proposed in Japanese Patent Laid-Open No. 9-128915 (published on May 16, 1997), and in Japanese Patent Laid-Open No. 9-330571 (published on Dec. 22, 1997).

It is stated in such proposals that a position orbit (virtual circular orbit) is provided so as to ignore the eccentricity, as shown in FIG. 20, removing this orbit from the demodulation signals of the head, in order to obtain a demodulation position, and the actuator is controlled with the demodulation position. By this, as FIG. 19 shows, the head 90 is positioned on the circular orbit 110 with the rotation axis 98 of the spindle motor as the center, using the position signal with respect to the circular orbit of the eccentric position signal 100, and reads data from/writes data to the disk 94. The orbit 110 of the head 90 is represented with a line, as shown in FIG. 21, then the orbit 110 crosses the orbit 102 of the position signal indicated by a sine wave.

An area demodulation method, where 2-phase signals PosN and PosQ are used for the position signals, has been in use. FIG. 22 is a diagram depicting 2-phase servo position signals, FIG. 23 is a block diagram depicting the position demodulation circuit thereof, and FIG. 24 to FIG. 26 are diagrams depicting the position demodulation signals.

As FIG. 22 shows, the position signal (servo signal) is comprised of a servo mark, gray code (track number), index, and offset signals (PosA–PosD). As FIG. 23 shows, the track number and the offset signals (PosA–PosD) are separated from the position signals from the head 90 in the block 120, and the 2-phase servo signals PosN and PosQ are calculated as follows.

$$PosN = PosA - PosB$$

$$PosQ = PosC - PosD$$

The position demodulation is performed so that either PosN or PosQ, whichever is smaller in the block 122, is used as Pos1. In other words, as shown in FIG. 22, either PosN or PosQ, whichever is smaller, is selected.

This means that the amplitude of the read output of each offset signal (PosA–PosD) from the head 90 is in proportion to the area of the offset signal (PosA–PosD) at the position of the head 90. In other words, this servo signal can demodulate the position of the head by demodulating the area indicated by amplitude.

The position sensitivity gain 124 changes the gain according to the track position. Such a demodulation method is described in detail in Japanese Patent Laid-Open No. 8-195044 (published on Jul. 30, 1996), for example.

In the case of the 2-phase servo signals of this area demodulation method, a crossover (switching) of PosN and PosQ is generated during demodulation, as shown in FIG. 24. If the head 90 crosses the position signal diagonally, as shown in FIG. 22, that is when the head 90 has velocity, an error occurs to the demodulation positions by PosN and PosQ, and a velocity offset of NQ is generated. In other words, the 2-phase servo signals PosN and PosQ can be observed with a ¼ phase shift in the track direction, as shown in FIG. 24, only when the velocity of the actuator is zero.

For example, FIG. 25 shows the result of simulating the status of PosN and PosQ when the head moves at a 20 track/sample in the device. As FIG. 25 shows, the phase relationship between PosN and PosQ is shifted. FIG. 26 shows the result of calculating the demodulation position at this time, and the switching of PosN and PosQ makes correct position demodulation impossible.

As FIG. 25 and FIG. 26 show, offset is different between the demodulation blocks of PosN and PosQ. To correct offset due to the velocity, Japanese Patent Laid-Open No. 2001-256741 (published on Sep. 21, 2001), for example, discloses inputting the velocity V of the actuator into the block 122, in order to correct PosN and PosQ.

However, in the above mentioned velocity offset correction method, PosN and PosQ are corrected by the velocity V of the head obtained from the demodulation position in FIG. 20. On the other hand, as FIG. 19 and FIG. 21 show, eccentricity is ignored in the virtual circular control, so the velocity correction values for the position signals PosN and PosQ by eccentricity are different from those acquired from the demodulation positions.

Therefore in the case of virtual circular control, accurate velocity offset correction is difficult. Track pitch in particular is currently narrow because of the increase in recording densities, where the number of eccentric tracks increases and higher precision positioning is requested, so the difference in correction velocity can no longer be ignored.

SUMMARY OF THE INVENTION

With the foregoing in view, it is an object of the present invention to provide a head position control method, a disk device, and a servo track write method for accurately executing velocity offset correction of the position signals, even if virtual circular control is performed.

It is another object of the present invention to provide a head position control method, a disk device, and a servo track write method to obtain an accurate demodulation position from the position signals of the area demodulation method, even when virtual circular control is performed for the head on an eccentric disk.

It is still another object of the present invention to provide a head position control method, a disk device, and servo track write method to control positions at high precision using the position signals of the area demodulation type method.

To achieve these objects, the present invention is a head position control method for controlling the position of a head on a virtual circular orbit of a disk, comprising a step of demodulating a position signal of the disk read by the head, a step of calculating a demodulation position from the demodulation result, a step of subtracting the positional fluctuation caused by the eccentricity of the disk from the demodulation position, and a step of calculating the control amount according to the positional error between the demodulation position after subtraction and the target position, so as to control the actuator for driving the head. And the calculation step comprises a step of correcting the demodulation result with a correction value according to the velocity of the virtual circular orbit reference of the head, and the relative velocity between the virtual circular orbit and the position signal of the disk, and calculating the demodulation position.

A disk device of the present invention is a disk device for controlling the position of a head on a virtual circular orbit of a disk, comprising a head for reading a position signal of the disk, an actuator for driving the head, and a control section which demodulates a position signal from the head and controls the actuator for driving the head. And the control section corrects the demodulation result with a correction value according to a velocity of the virtual circular orbit reference of the head, and a relative velocity between the virtual circular orbit and the position signal of the disk, calculates a demodulation position, subtracts the positional oscillation caused by the eccentricity of the disk from the demodulation position, and calculates the control amount of the actuator according to the positional error between the demodulation position after subtraction and the target position.

In the present invention, when the virtual circular control of the area demodulation method is performed, the velocity offset correction of the 2-phase servo signal is performed with both the head velocity of the virtual circular orbit reference and the relative velocity of the virtual circular orbit and the position signal, so head position control at higher precision is possible even if virtual circular orbit control is performed. Therefore even if the track pitch of the disk becomes narrower and the number of eccentric tracks increases, virtual circular orbit control at higher prevision is possible, and the read/write performance can be improved.

In the present invention, it is preferable that the demodulation step comprises a step of demodulating a first position information and a second position information, where phases are mutually different from the above mentioned position signals by the area demodulation. Since the area demodulation method using the first and second position information is used, the virtual circular orbit control can be easily performed.

In the present invention, it is also preferable that the calculation step comprises a step of combining the first position information and the second position information with predetermined weights, and calculating the demodulation position. Since demodulation by combining the first and second position information is included, a demodulation position without switching the step difference can be obtained.

In the present invention, it is also preferable that the calculation step comprises a step of correcting the first position information with a first correction value according to the velocity of the virtual circular orbit reference of the head and the relative velocity of the virtual circular orbit and the position signal of the disk, and correcting the second position information with a second correction value according to the velocity of the virtual circular orbit reference of the head and the relative velocity of the virtual circular orbit and the position signal of the disk. Since the velocity offset is corrected according to the recording position of the first and second position information, the velocity offset correction can be more accurately performed.

In the present invention, it is also preferable that the calculation step further comprises a step of calculating the demodulation position by multiplying the first position information by a predetermined weight M, multiplying the second position information by another predetermined weight (1−M), and combining these the multiplication results.

It is also preferable that the present invention further comprises a step of calculating the relative velocity by differentiating a virtual circular position orbit for subtracting the positional oscillation. Since the relative velocity is obtained using the virtual circular position orbit, it is unnecessary to save data separately, and the relative position synchronizing with the virtual circular position orbit can be obtained.

A servo track write method of the present invention is a servo track write method for writing a position signal to a mounted disk, comprising a step of demodulating a position signal of the disk read by a head, a step of calculating the demodulation position by correcting the demodulation result by a correction value according to the velocity of a virtual circular orbit reference of the head and a relative velocity of the virtual circular orbit and the position signal of the disk, a step of subtracting the positional oscillation caused by the eccentricity of the disk from the demodulation position, a step of calculating the control amount according to the positional error between the demodulation position after subtraction and the target position, so as to control an actuator for driving the head, and a step of rewriting the position signal along the virtual circular orbit of the head.

According to this feature of the present invention, when the virtual circular control of the area demodulation method is performed, the velocity offset correction of the 2-phase servo signal is performed with both the head velocity of the virtual circular orbit reference and the relative velocity of the virtual circular orbit and the position signal, so the position signal can be rewritten at higher precision by the virtual circular orbit control. Therefore even if the track pitch of the disk becomes narrower and the number of eccentric tracks increases, virtual circular orbit control at higher prevision is possible, and the read/write performance can be improved.

It is preferable that in the present invention the demodulating step comprises a step of demodulating a position signal of the disk, where the position signals have been written outside the device where the disk is mounted. Therefore virtual circular control, which does not follow up eccentricity, can be implemented at high prevision even if a disk where position signals have been written outside is used.

DESCRIPTION OF THE PREFERRED EMBODIMENTS

Embodiments of the present invention will now be described in the sequence of the disk storage device, position demodulation system of the first embodiment, position demodulation system of the second embodiment, examples, servo track write method, and other embodiments, but the present invention is not limited to the following embodiments.

[Disk Storage Device]

Figure 1:
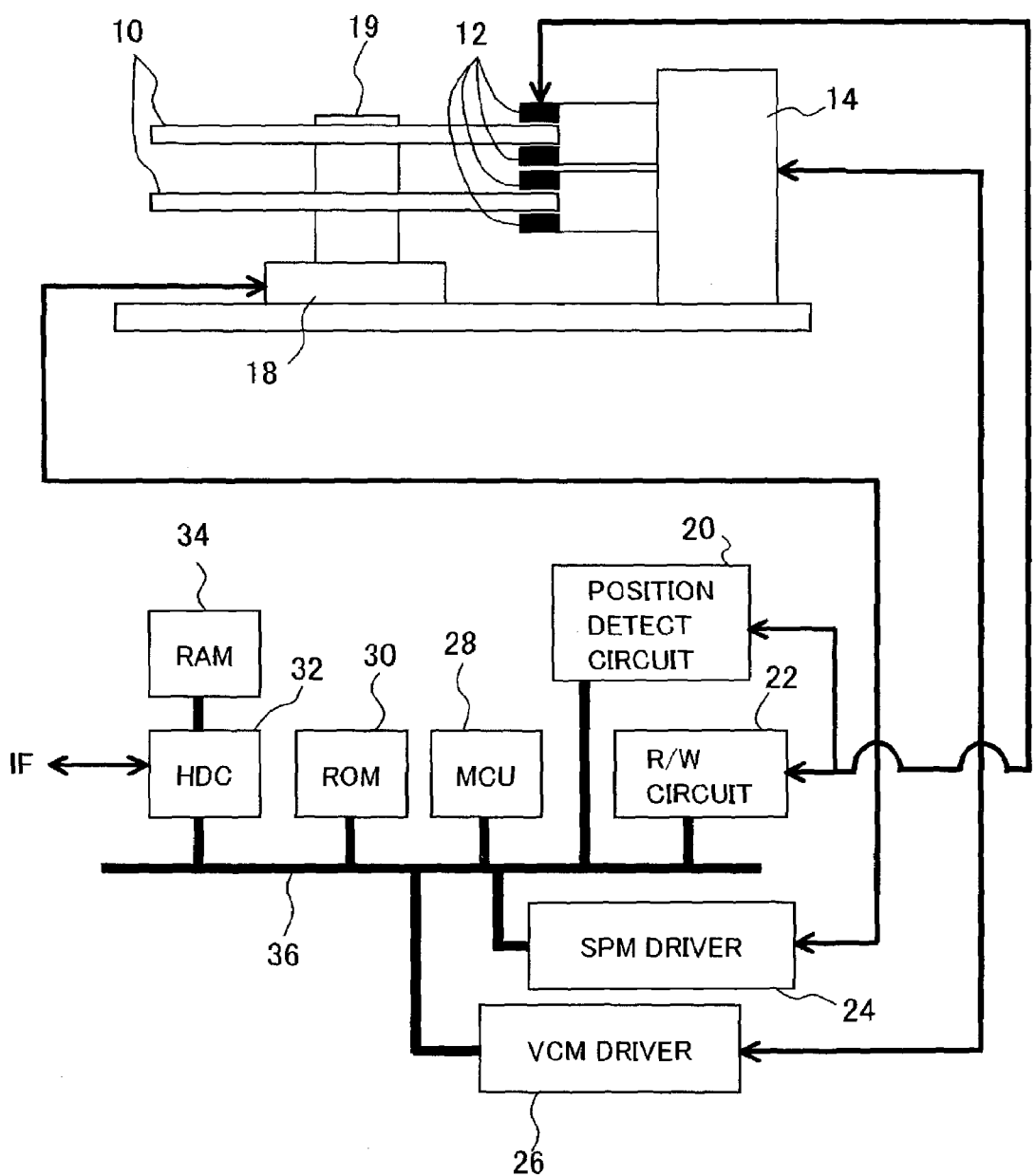
FIG. 1 is a block diagram depicting a disk storage device of an embodiment of the present invention.
Figure 2:
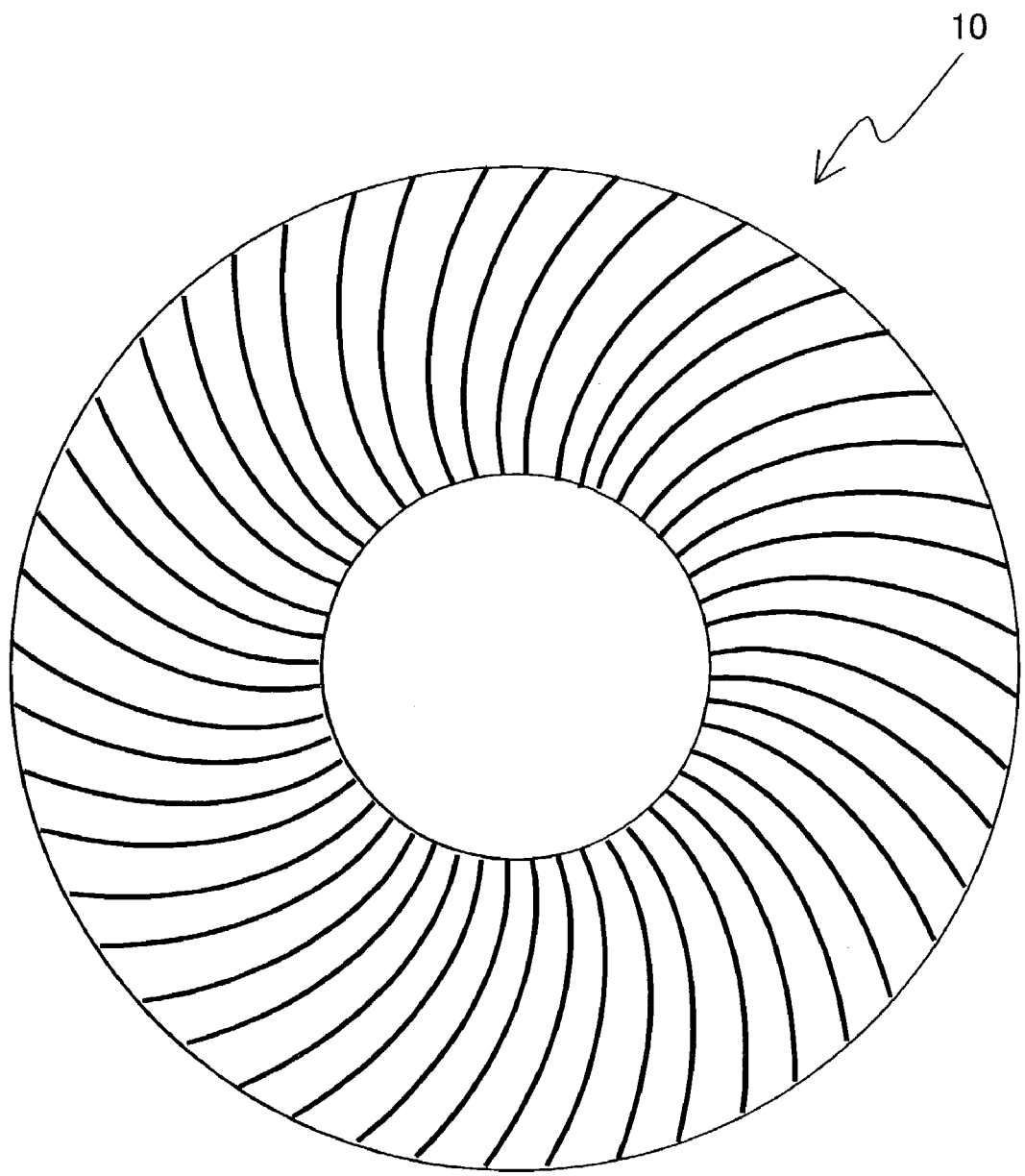
FIG. 2 is a diagram depicting the position signals of the disk in FIG. 1.
Figure 3:
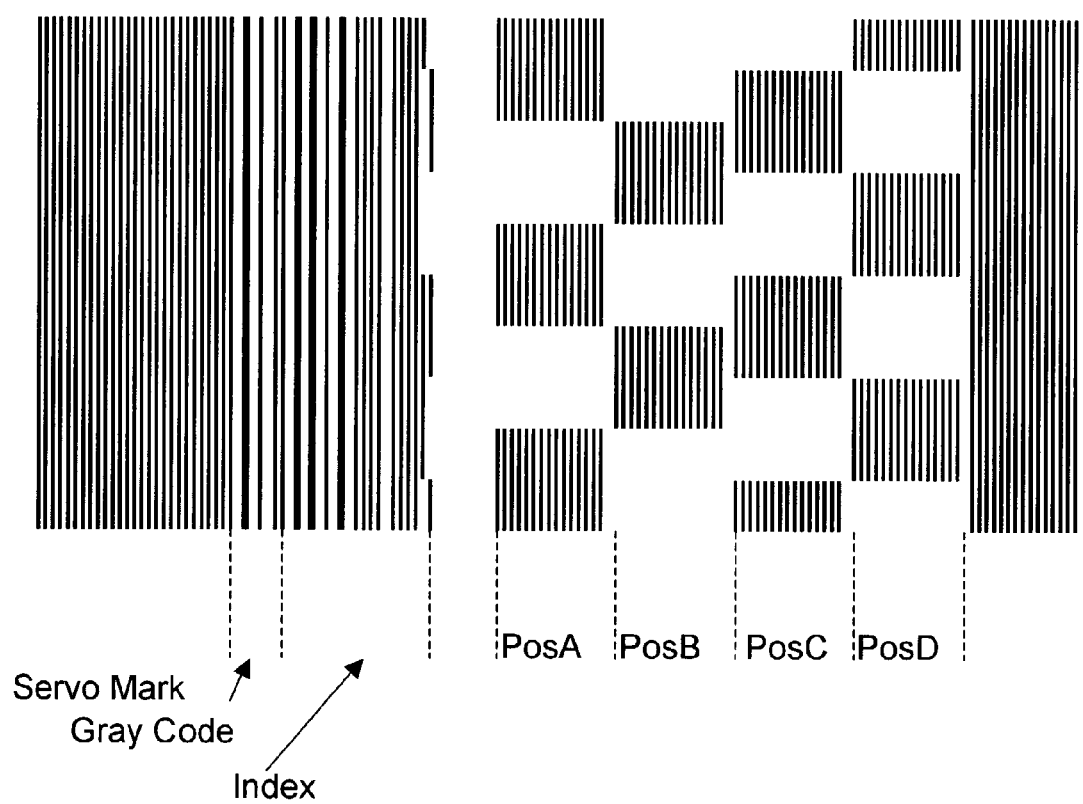
FIG. 3 is a diagram depicting the position signals in FIG. 2 in detail.
Figure 4:
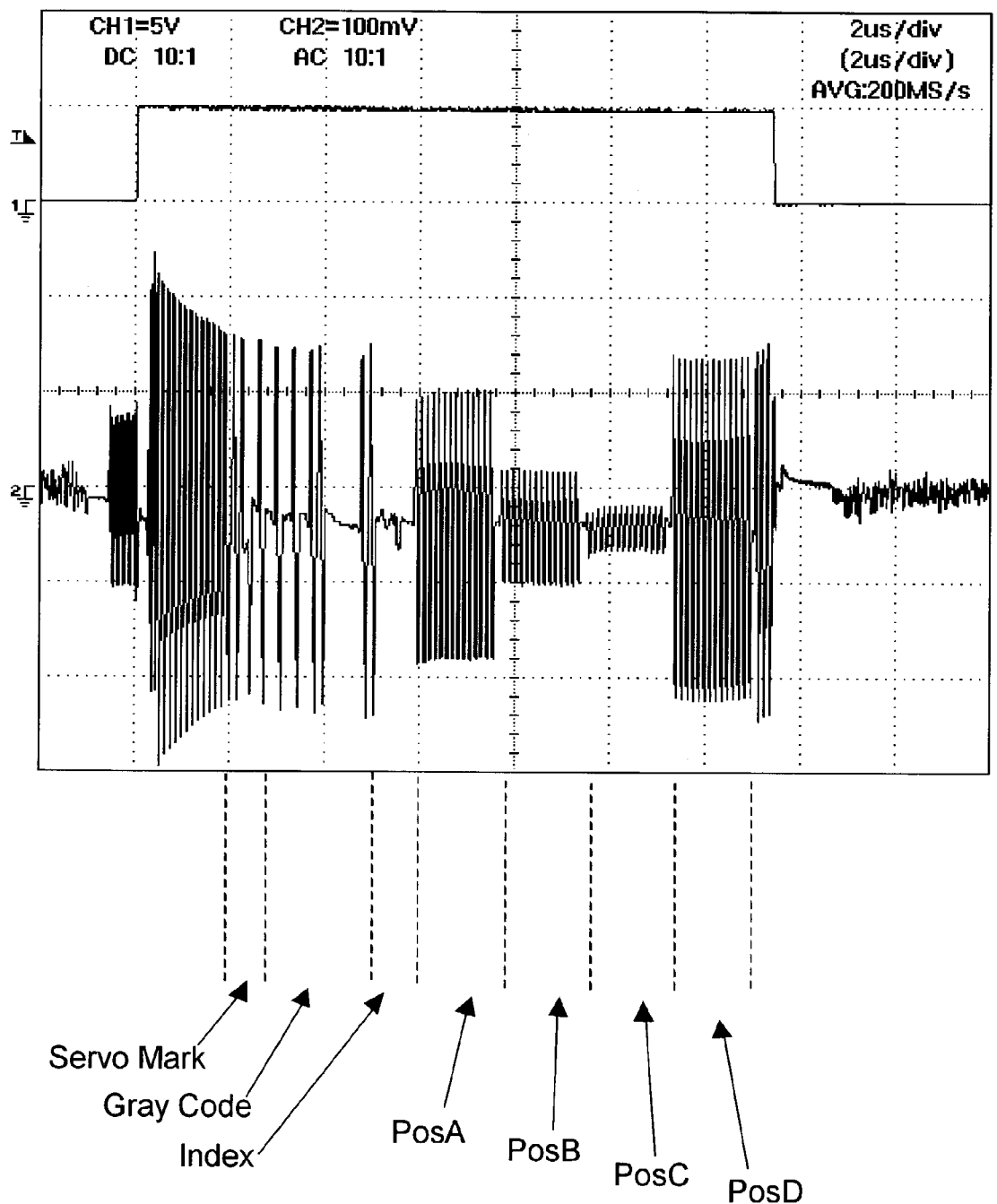
FIG. 4 is a diagram depicting the wave form of reading the position signals in FIG. 2.
Figure 5:
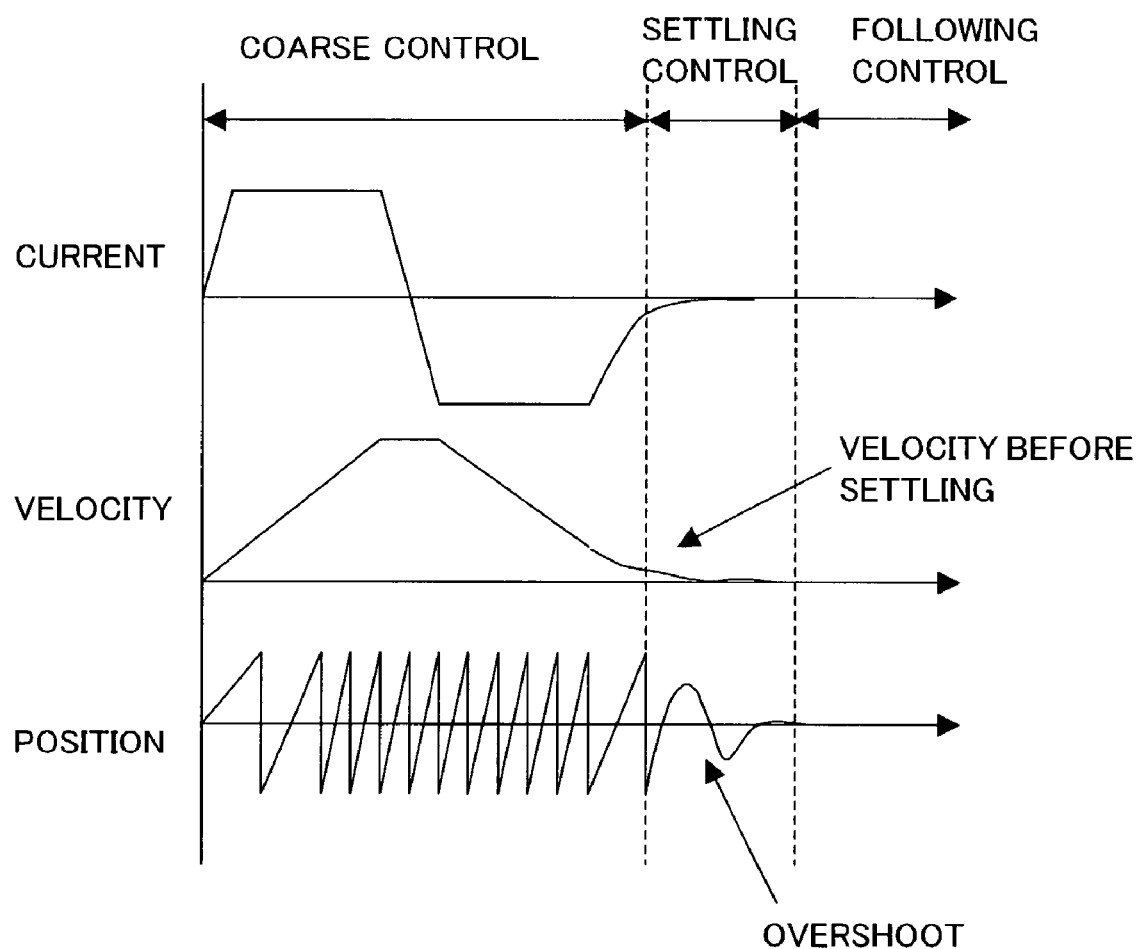
FIG. 5 is a diagram depicting the seek operation of the head in FIG. 1.

FIG. 1 is a diagram depicting the configuration of the disk storage device of an embodiment of the present invention, FIG. 2 is a diagram depicting the arrangement of position signals of the magnetic disk in FIG. 1, FIG. 3 is a diagram depicting the configuration of the position signals of the magnetic disk in FIG. 1 and FIG. 2, FIG. 4 is a diagram depicting the read wave form of the position signals in FIG. 3, and FIG. 5 is a diagram depicting the head position control in FIG. 1.

FIG. 1 shows a magnetic disk device as the disk storage device. As FIG. 1 shows, a magnetic disk 10, which is a magnetic storage medium, is disposed on the rotation axis 19 of the spindle motor 18. The spindle motor 18 rotates the magnetic disk 10. An actuator (VCM) 14 has a magnetic head 12 at the tip, and moves the magnetic head 12 in the radius direction of the magnetic disk 10.

The actuator 14 is comprised of a voice coil motor (VCM), which rotates with the rotation axis as the center. In FIG. 1, two magnetic disk 10 are mounted on the magnetic disk device, and four magnetic heads 12 are simultaneously driven by the same actuator 14.

The magnetic head 12 is comprised of read elements and write elements. The magnetic head 12 is constructed by layering the read elements, including a magnetic resistance element, on a slider, and layering the write elements, including the write coil, thereon.

A position detection circuit 20 converts the position signals (analog signals) read by the magnetic head 12 into digital signals. A read/write (R/W) circuit 22 controls the read/write of the magnetic head 12. A spindle motor (SPM) drive circuit 24 drives a spindle motor 18. A voice coil motor (VCM) drive circuit 26 supplies drive current to the voice coil motor (VCM) 14, and drives the VCM 14.

A micro controller (MCU) 28 detects (demodulates) the current position from the digital position signal from the position detection circuit 20, and computes a VCM drive command value according to the error between the detected current position and the target position. In other words, the micro controller 28 performs position demodulation and servo control. A read only memory (ROM) 30 stores the control program of the MCU 28. A hard disk controller (HDC) 32 judges a position within a track based on the sector number of the servo signal and records and regenerates data. A random access memory (RAM) 34 temporarily stores the read data and the write data. The HDC 32 communicates with the host via the interface IF such as by ATA and SCSI. A bus 36 connects these components.

As FIG. 2 shows, servo signals (position signals) are arranged in the circumference direction at an equal interval from the outer circle to the inner circle. Each track is comprised of a plurality of sectors, and the solid line in FIG. 2 shows the recording position of the servo signal. As FIG. 3 shows, the position signal is comprised of a servo mark Servo Mark, track number Gray Code, index Index, and offset information PosA, PosB, PosC and PosD.

FIG. 4 is a diagram depicting the signal wave form when the position signal in FIG. 3 is read by the head 12. Using the track number Gray Code and the offset information PosA, PosB, PosC and PosD of the signal wave form shown in FIG. 4, a position of the magnetic head in the radius direction is detected. Also based on the index signal Index, the position of the magnetic head in the circumference direction is obtained. For example, the sector number when the index signal is detected is set to '0', which is incremented each time a servo signal is detected, so as to obtain the sector number of each sector of the track.

The sector number of this servo signal becomes a reference when the data is recorded or regenerated. There is one index signal per track. A sector number may be created instead of the index signal.

FIG. 5 shows an example of seek control of the actuator, which is performed by the MCU 28 in FIG. 1. Through the position detection circuit 20 in FIG. 1, the MCU 28 confirms the position of the actuator, performs servo computation, and supplies an appropriate current to the VCM 14. FIG. 5 shows the transition of control from seek start, for moving the head 12 from a certain track position to the target track position, the current of the actuator 14, velocity of the actuator (head), and the position of the actuator (head).

In other words, for seek control, the head 12 can be moved to the target position by transiting as coarse control, setting control, and following control. The coarse control is basically velocity control, and the setting control and following control are basically position controls, and for both cases, the current position of the head must be detected.

To confirm such positions, servo signals are recorded on the magnetic disk in advance, as shown in FIG. 2. In other words, as FIG. 3 shows, a servo mark to indicate the start position of a servo signal, a gray code to indicate a track number, an index signal and PosA–PosD to indicate offset as such, are recorded. These signals are read by the magnetic head, the position detection circuit 20 converts these servo signals into digital values, and the MCU 28 demodulates the position and controls the actuator 14, as described in FIG. 6 and later.

[Position Demodulation System of First Embodiment]

Figure 6:
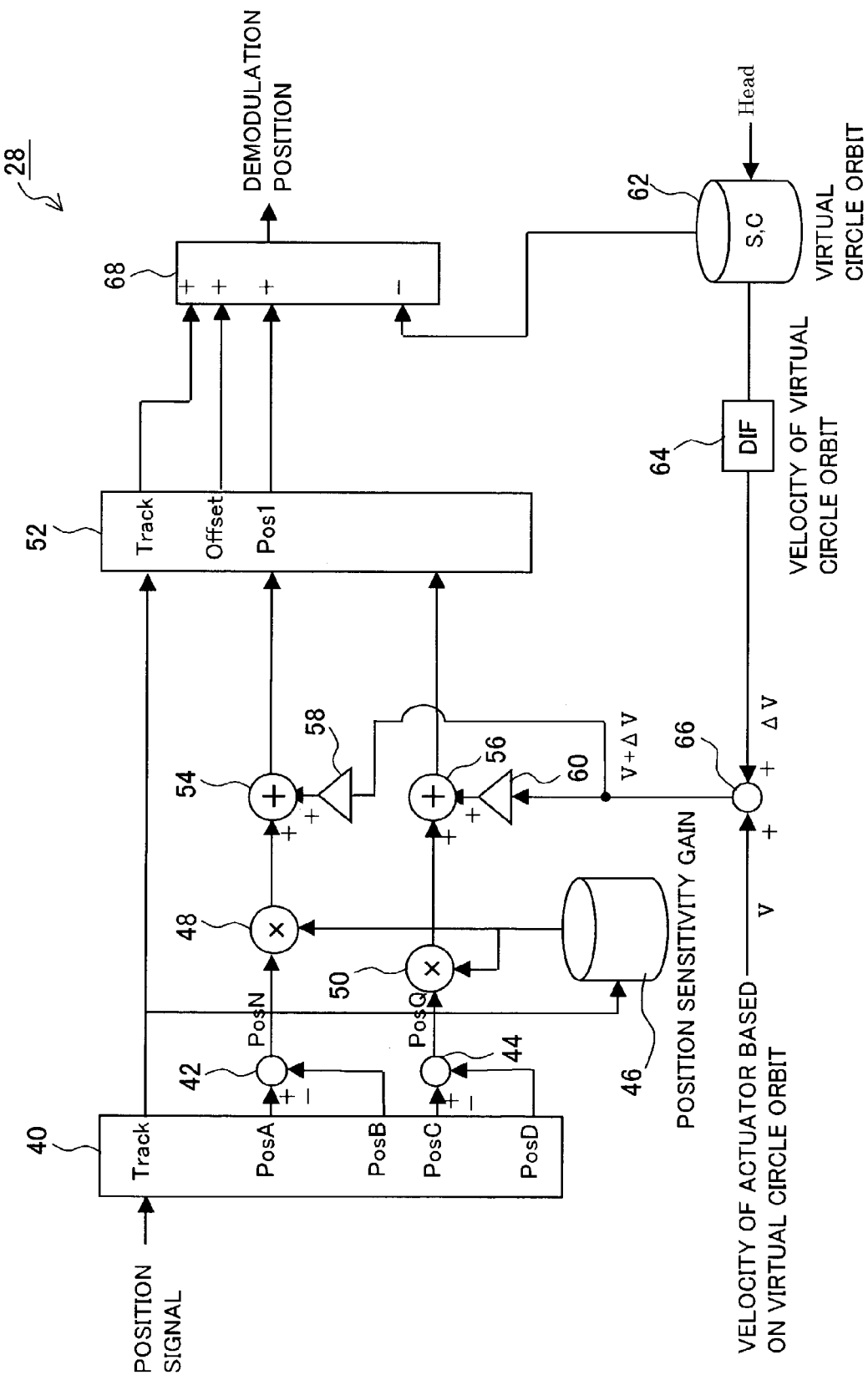
FIG. 6 is a block diagram depicting the functions of the position demodulation section of the head position control section in FIG. 1 according to the first embodiment.
Figures 7, 8:
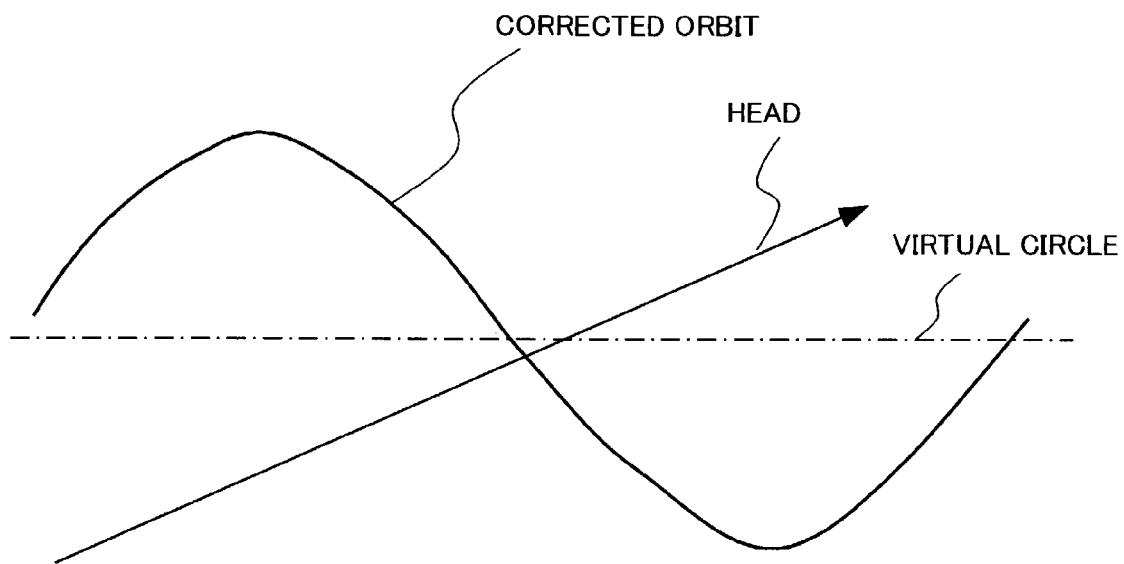
FIG. 7 is a diagram depicting the velocity offset correction in the virtual circular control in FIG. 6.
FIG. 8 is a diagram depicting the configuration of the virtual circular orbit table in FIG. 6.

FIG. 6 is a block diagram depicting the position demodulation system of an embodiment of the present invention, FIG. 7 is a diagram depicting the operation thereof, and FIG. 8 is a diagram depicting a virtual circular orbit table 62 thereof. The position demodulation system in FIG. 6 is executed by the MCU 28 in FIG. 1. The MCU 28 executes a known servo computation (e.g. observer control) using the demodulation position in FIG. 6 as a current position, and calculates the control amount of the VCM 14.

Figure 22:
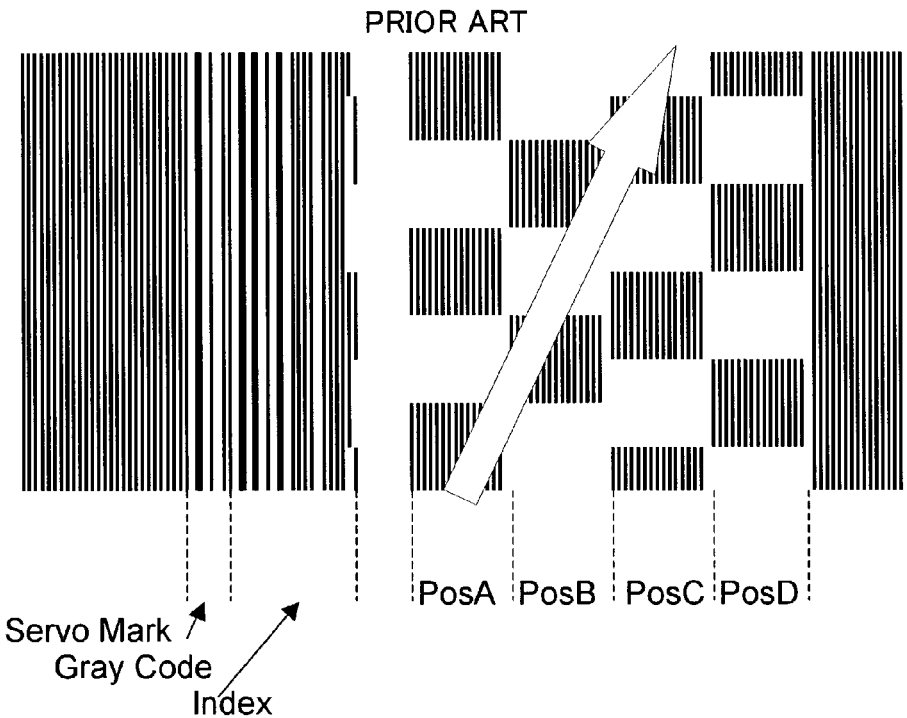
FIG. 22 is a diagram depicting a position signal of an area demodulation type position signal.
Figure 23:
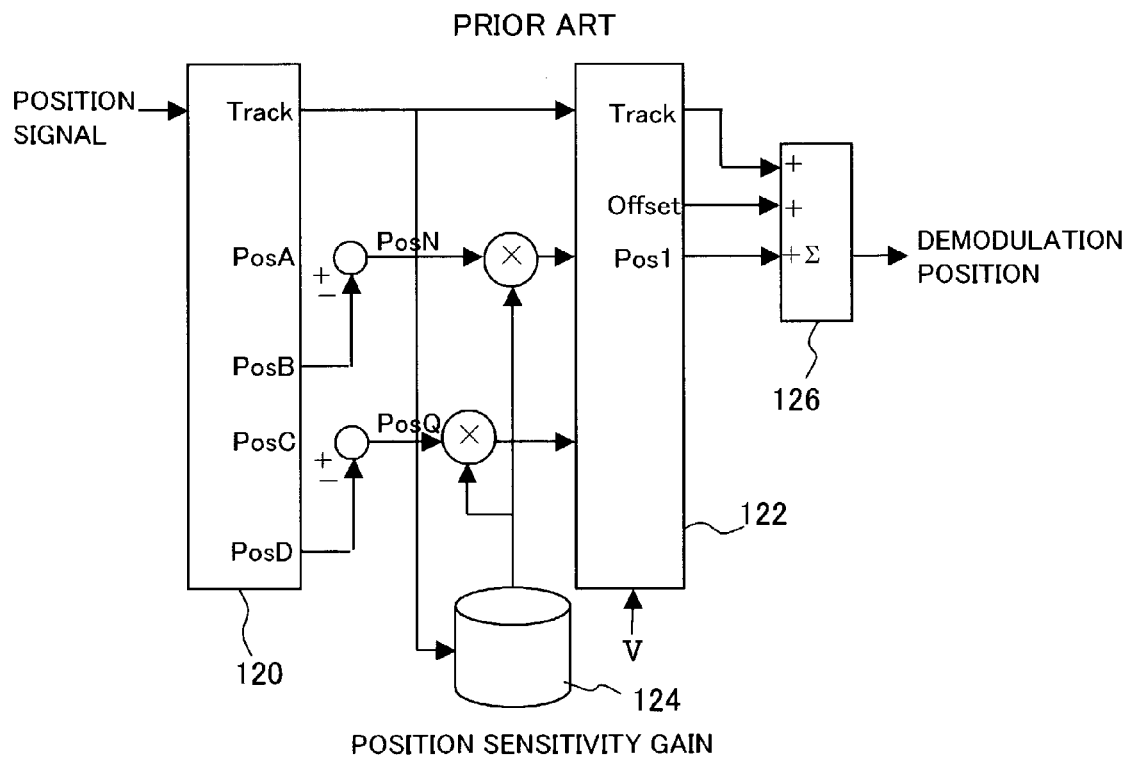
FIG. 23 is a diagram depicting a conventional position demodulation section which performs velocity offset correction.
Figure 24:
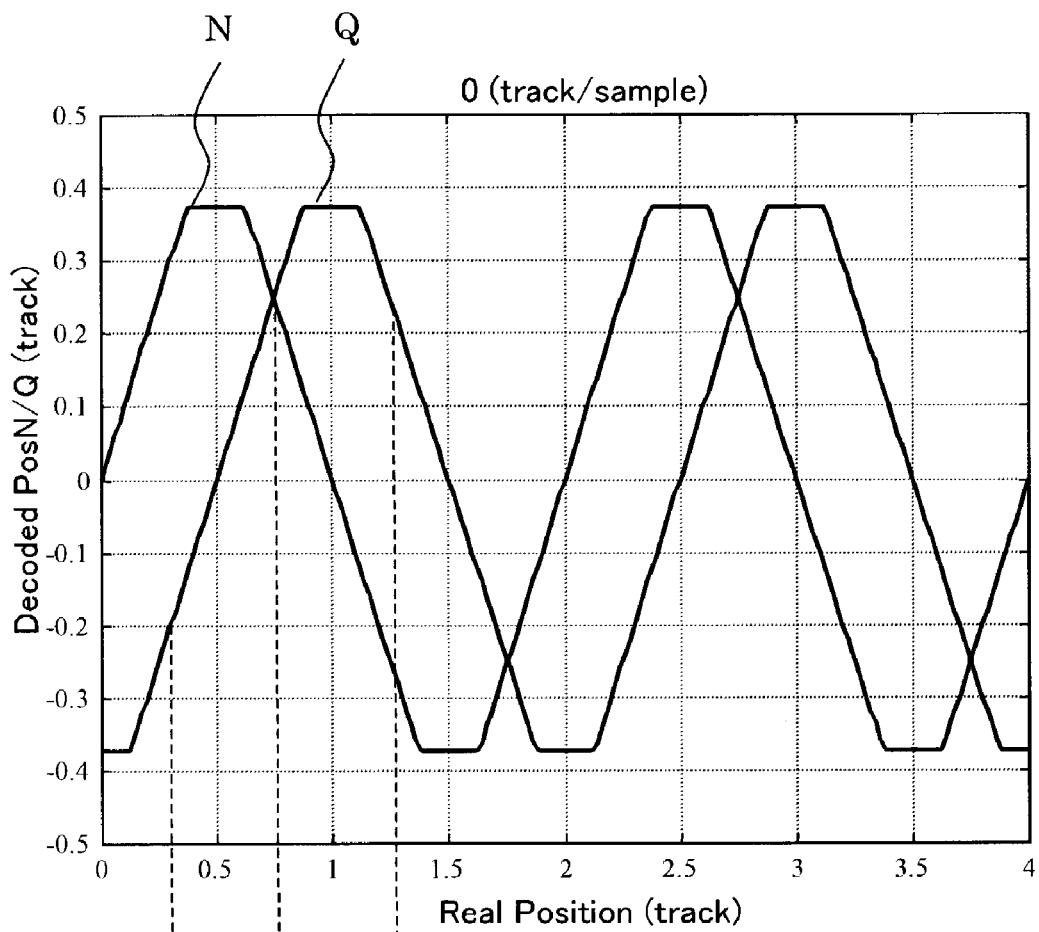
FIG. 24 is a diagram depicting the 2-phase servo signal in FIG. 22.
Figure 24:
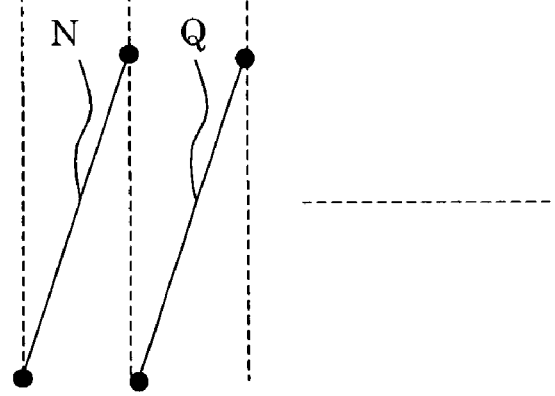
Figure 25:
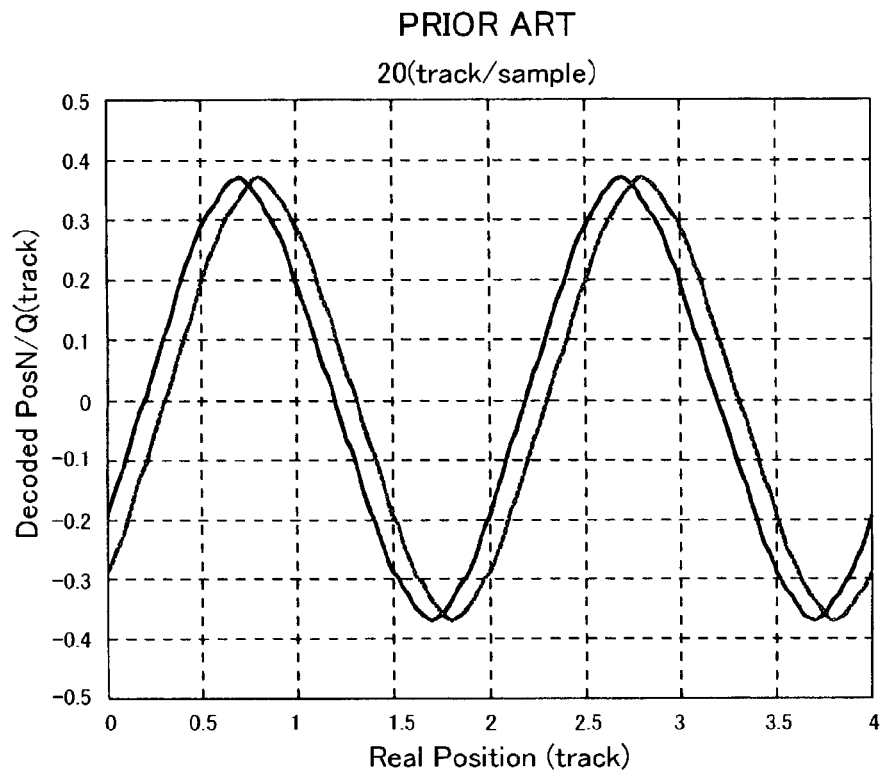
FIG. 25 is a diagram depicting the 2-phase servo signal when the velocity is faster.
Figure 26:
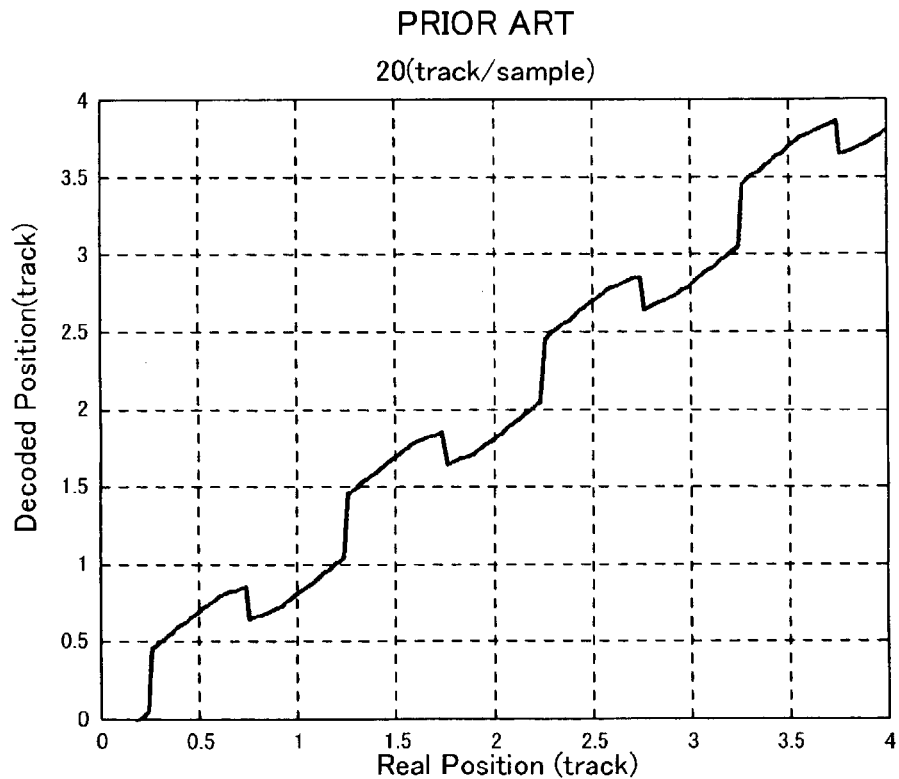
FIG. 26 is a diagram depicting the demodulation position by the 2-phase servo signal in FIG. 25.

In FIG. 6, the signal demodulation section 40 separates the track number and the offset signals (PosA–PosD) from the position signals from the head 12 (see FIG. 22). The arithmetic unit 42 and 44 calculate the 2-phase servo signals PosN and PosQ by the following computations respectively.

$$PosN = PosA - PosB \qquad (1)$$

$$PosQ = PosC - PosD \qquad (2)$$

The multipliers 48 and 50 multiply PosN and PosQ by the position sensitivity gain from the position sensitivity gain table 46. The position sensitivity gain is a conversion factor for determining the positions using PosN and PosQ, and changes according to the track position. The table 46 stores the position sensitivity gain for each zone, so that the position sensitivity gain of a zone according to the demodulated track position is read. This position sensitivity gain correction is described in detail in Japanese Patent Laid-Open No. 8-195044 (published on Jul. 30, 1996), for example.

Then the velocity offset is corrected. Velocity offset correction will be described later. For PosN and PosQ, for which velocity offset correction was performed, one is selected by the selection section 52, and Pos1 is obtained.

The position demodulation section 68 adds the offset (difference between positions of the read and write elements) and the position Pos1 to the demodulated track number. In the virtual circular control, the virtual circular orbit table 62 is created. The virtual circular orbit is created synchronizing with the sector on the disk 10, and the phase and amplitude thereof varies depending on the device and the head. Such a position orbit is generated based on $$\text{Position orbit} = S\ [\text{Head}] \times \sin(\omega t) + C\ [\text{Head}] \times \cos(\omega t) \qquad (3)$$

Here, $\omega$ is a rotation angle frequency of the disk. The values of the factors S and C are stored in the table 62 for each head. FIG. 8 is a diagram depicting the virtual circular orbit table 62 where the sine wave factor S and the cosine wave factor C are stored for each head, 0, 1, ... n.

This table 62 is indexed by the head number Head, the corresponding factor S of the sine wave and the factor C of the cosine wave are derived, and the position orbit is generated using the above mentioned formula of the position orbit. The position demodulation section 68 subtracts the position orbit from the added value of the above mentioned track number, offset and position Pos1, and the demodulation position is output.

The above mentioned velocity offset correction will now be described. In the above mentioned prior art, the velocity V of the actuator is a velocity of a circular orbit reference where the head follows up. Therefore in the case when the head does not follow up the circular orbit of the servo signal and is positioned on the virtual circular orbit, as in the case of the present invention, an error $\Delta V$, for the amount of the relative velocity between the virtual circular orbit for positioning and the servo signal on the disk, occurs.

As FIG. 7 shows, the corrected orbit for positioning the head on the virtual circular orbit exhibits a sine wave, so the relative velocity is a cosine wave, which can be easily calculated. Actually the virtual circular orbit is generated synchronizing with the sectors on the disk 10, as mentioned above, and the phase and the amplitude thereof vary depending on the device and the head. Such a position orbit is generated by the formula Position orbit=$S$ [Head]×sin($\omega t$)+$C$ [head]×cos($\omega t$)

where $\omega$ is the rotation angle frequency of the disk. And the values of the factor S of the sine wave and the factor C of the cosine wave are stored for each head. Depending on the case, the table of the values of the factors S and C may be provided for each location of the disk in the radius direction.

The velocity of the virtual circular orbit (relative velocity) at this time is obtained by differentiating the position orbit. In other words, Velocity of orbit={$S$ [Head]×cos($\omega t$)−$C$ [Head]×sin($\omega t$)}/$\omega$     (4)

Therefore the velocity of the orbit is calculated from the position orbit using the differentiator 64, which differentiates the position orbit. Since the position orbit changes depending on the sample, this velocity also changes depending on the sample. Accordingly, the velocity offset of PosN and PosQ also changes depending on the sample. Even if the head is positioned on the virtual circular orbit without a "0" error, this velocity offset must be calculated for each sample and continuously be added.

When seek control is being executed, the velocity of the actuator increases even more. The velocity V is constantly calculated during seek control, so that the current velocity and the velocity with the next sample are always known. So the velocity V due to the seek control is added with the above mentioned velocity ΔV due to the orbit by the adder 66, and is used for the velocity offset correction of PosN and PosQ.

For the velocity offset correction of PosN and PosQ, the values of the velocity offset are added to the PosN and PosQ by the adders 54 and 56. This velocity offset value is determined by the following formulas. The factor by which the velocity is multiplied can be uniquely determined from the specification of the servo signals shown in FIG. 3 (from bit 0 of Gray Code to the boundary of PosA and PosB and the boundary of PosC and PosD), and is set at the gain of the amplifiers 58 and 60 respectively.

Pos$N$ offset=velocity×(time between Gray Code Bit 0 and boundary of Pos$A$ and Pos$B$)/sampling period     (b 5)

Pos$Q$ offset=velocity×(time between Gray Code Bit 0 and boundary of Pos$C$ and Pos$D$)/sampling period     (6)

In other words, the factor is determined from the time between the bit 0 of the Gray Code (track number) and the boundary of PosA and PosB, or the boundary of PosC and PosD.

In this way, in the virtual circular control, the relative velocity can be calculated from a known sine wave position orbit (position is Sin →velocity is Cos), so the offset of PosN and PosQ during tracking can be uniquely determined.

As FIG. 6 shows, both the position orbit and the velocity orbit can be obtained from the output of the table 62 of the virtual circular orbit. The velocity ΔV is added with the relative velocity V of the actuator 14 from the virtual circular orbit, and the results are input to the demodulation sections of the PosN and PosQ. There the velocity ΔV and the relative velocity V are combined and calculated as a position.

[Position Demodulation System of Second Embodiment]

Figure 9:
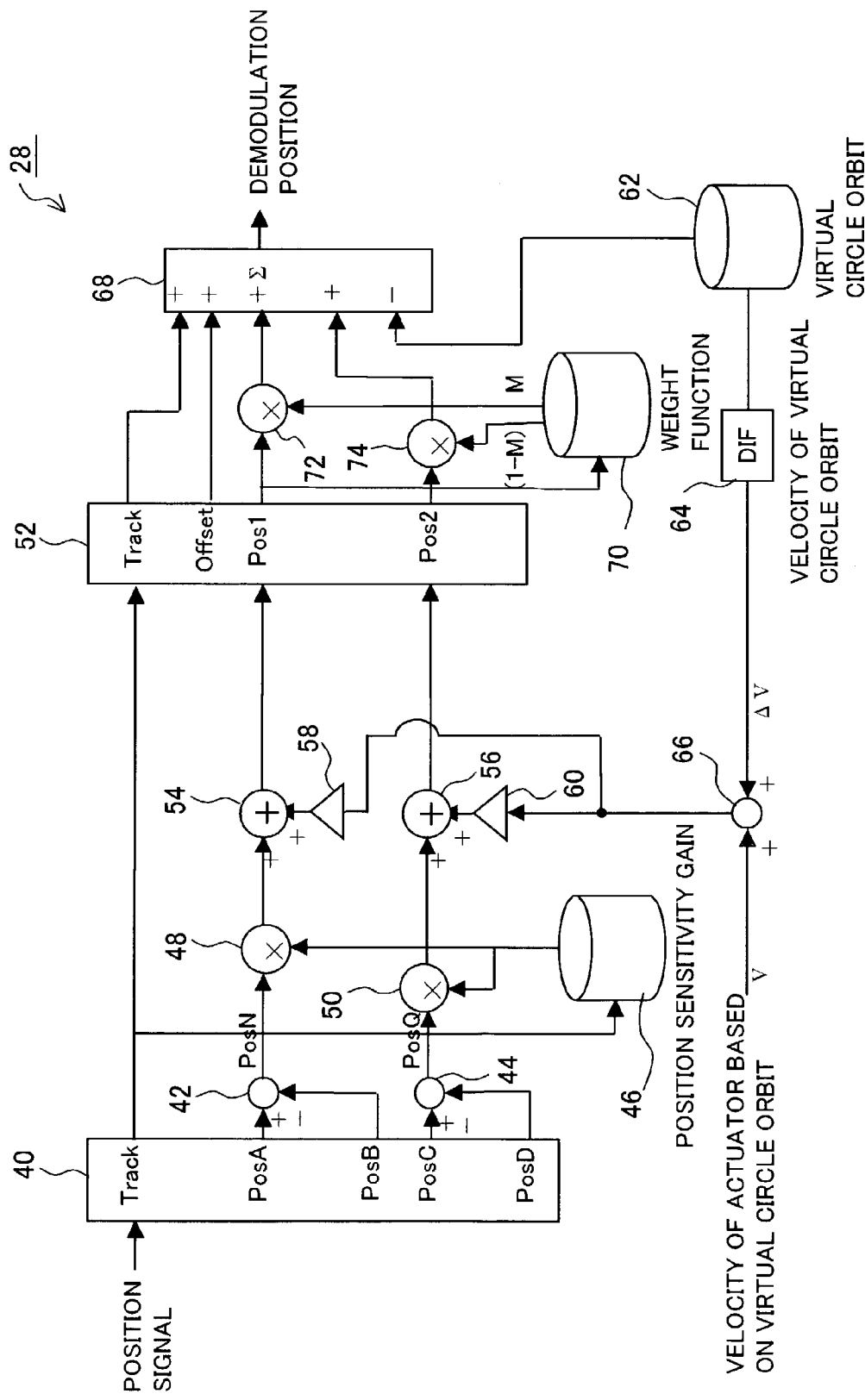
FIG. 9 is a block diagram depicting the position demodulation section of the second embodiment of the present invention.
Figure 10:
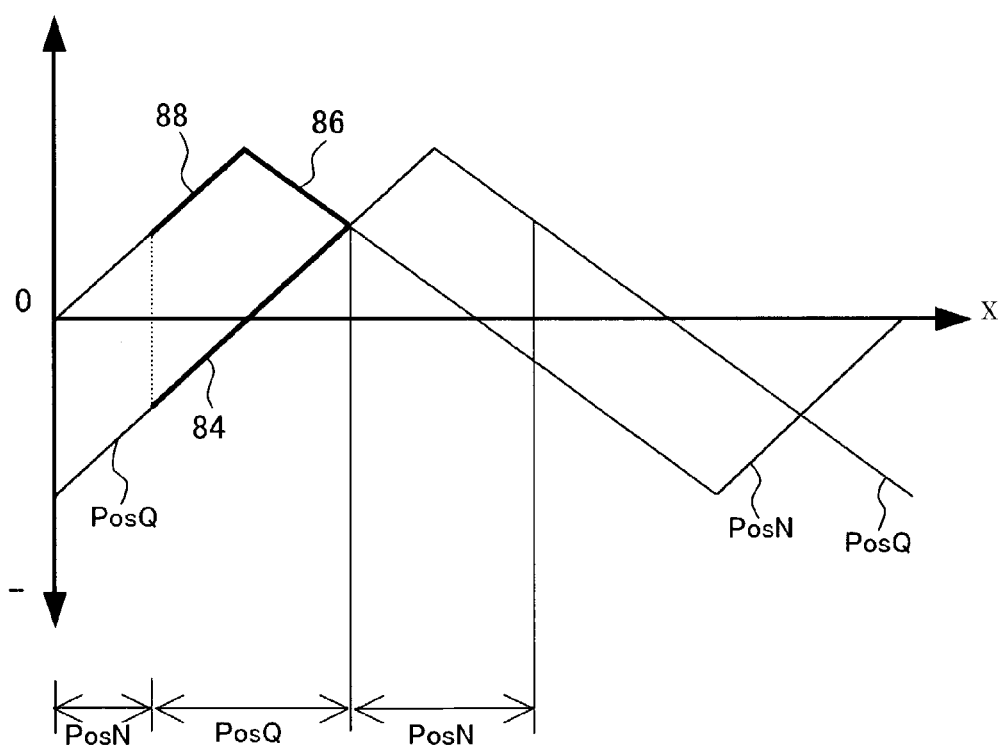
FIG. 10 is a diagram depicting PosN and PosQ in FIG. 9.
Figure 11:
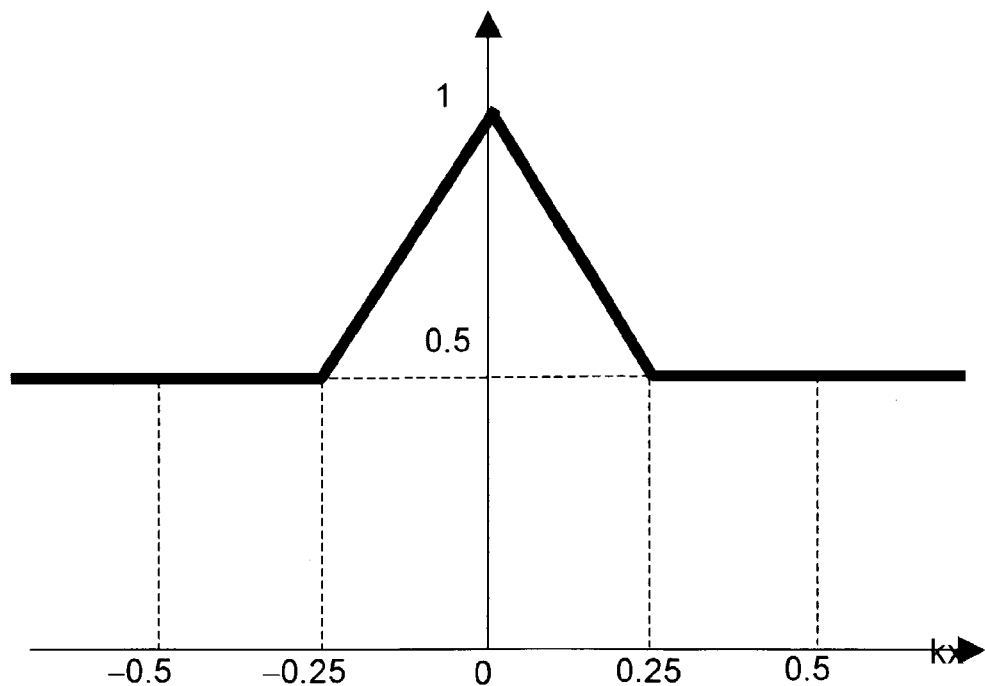
FIG. 11 is a diagram depicting the weight gain function in FIG. 9.
Figure 12:
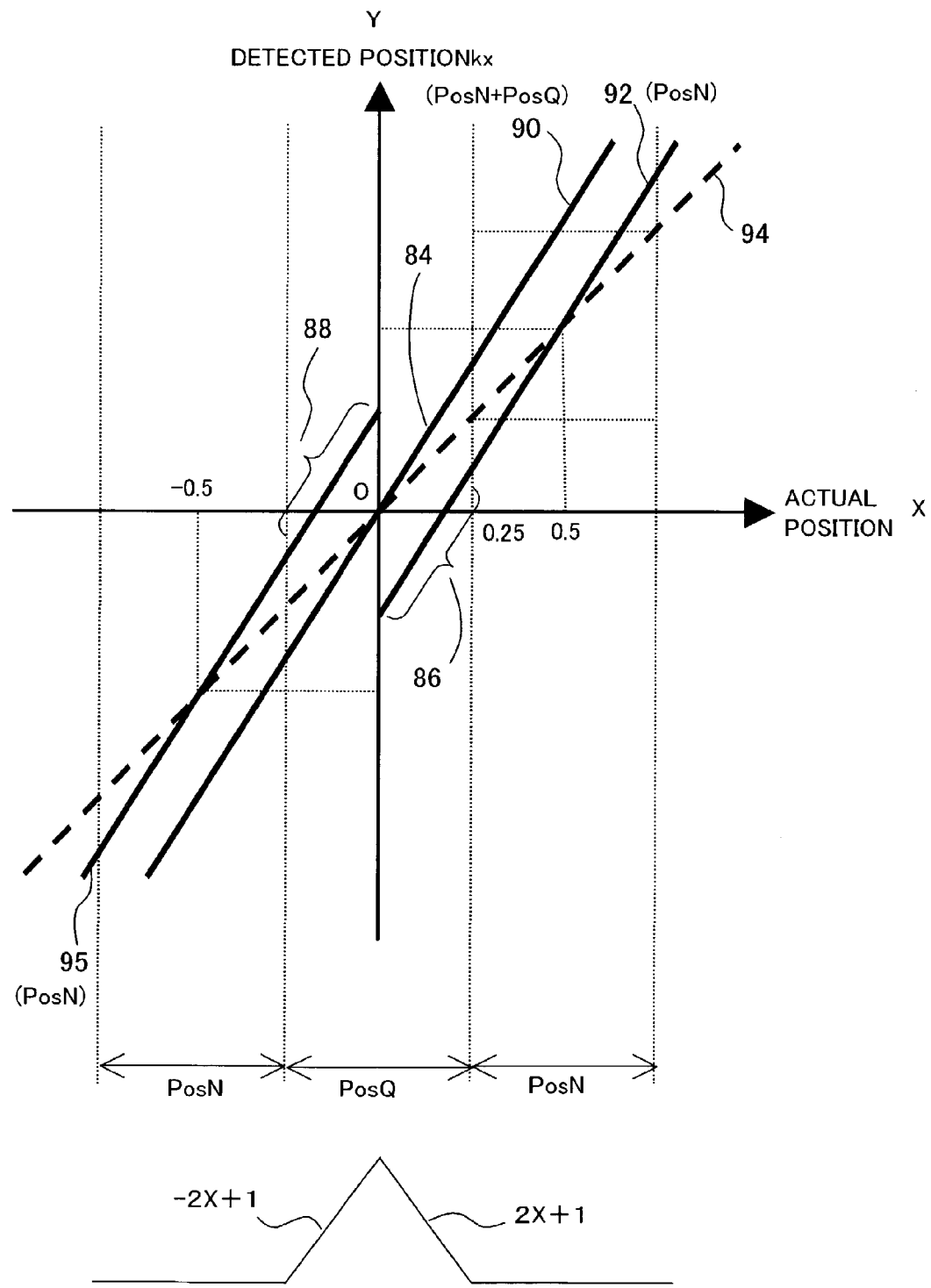
FIG. 12 is a diagram depicting a demodulation method combining PosN and PosQ in FIG. 9.

FIG. 9 is a block diagram depicting the position demodulation system of the second embodiment of the present invention, FIG. 10 is a diagram depicting the NQ combining demodulation operation thereof, FIG. 11 is a diagram depicting the weight function of the NQ combining demodulation operation thereof, and FIG. 12 is a diagram depicting the NQ combining demodulation operation based on the weight function.

The position demodulation system in FIG. 9 as well is executed by the MCU 28 in FIG. 1. The MCU 28 performs a known servo computation (e.g. observer control) using the demodulation position in FIG. 9 as the current position, and calculates the control amount of the VCM 14.

In FIG. 9, the same reference numerals have been assigned to the same components as those described in FIG. 6, and the signal demodulation section 40 separates the track number and the offset signals (PosA−PosD) from the position signals from the head 12 (see FIG. 22). The computing units 42 and 44 calculate the 2-phase servo signals PosN and PosQ respectively.

And the multipliers 48 and 50 multiply PosN and PosQ by the position sensitivity gain from the position sensitivity gain table 46. Then the velocity offset is corrected. The velocity offset correction is the same as the first embodiment in FIG. 6. In other words, in the virtual circular control, the virtual circular orbit table 62 is disposed. The virtual circular orbit is generated synchronizing with the sectors on the disk 10, and the phase and amplitude thereof vary depending on the device and the head. To generate such a position orbit, the position orbit is given by Position orbit=$S$ [Head]×sin($\omega t$)+$C$ [Head]×cos($\omega t$)

and the values of the factors S and C are stored in the table 62 for each head. This table 62 is indexed by the head number Head, the corresponding factor S of the sine wave and the factor C of the cosine wave are derived, and the position orbit is generated using the above formula of the position orbit.

The velocity of the virtual circular orbit at this time is obtained by differentiating the position orbit. In other words, Velocity of orbit (relative velocity)={$S$ [Head]×cos($\omega t$)−$C$ [Head]×sin($\omega t$)}/$\omega$ Therefore the velocity ΔV of the orbit is calculated from the position orbit using the differentiator 64 which differentiates the position orbit, and velocity V, due to the seek control, is added with the above mentioned velocity ΔV due to the orbit by the adder 66, and is used for the velocity offset correction of PosN and PosQ.

The values of the velocity offset to be added by the adders 54 and 56 are determined by the following formulas. The factor by which the velocity is multiplied can be uniquely determined from the specification of the servo signals shown in FIG. 3, and is set as the gain of the amplifiers 58 and 60 respectively.

Pos$N$ offset=velocity×(time between Gray Code Bit 0 and boundary of Pos$A$ and Pos$B$)/sampling period Pos$Q$ offset=velocity×(time between Gray Code Bit 0 and boundary of Pos$C$ and Pos$D$)/sampling period As shown in FIG. 9, both the position orbit and the velocity orbit can be obtained from the output of the table 62 of the virtual circular orbit. The velocity ΔV is added with the relative velocity V of the actuator 14 from the virtual circular orbit. And the above mentioned PosN offset value and the PosQ offset value obtained from the velocity (V+ΔV) are added to PosN and PosQ by the adders 54 and 56, and the results are input to the demodulation section 52.

For the demodulation section 52, the position demodulation method using the PosN and PosQ combining demodulation method, which the present inventors proposed in Japanese Patent Application No. 2001-269871 (filed on Sep. 6, 2001) "Position demodulation method and circuit of a disk device", is used.

When one of PosN or PosQ is selected, the step difference due to the switching of PosN and PosQ is generated, so the NQ combining demodulation solves the influence of the step difference due to the crossing over the boundary of PosN and PosQ by demodulating PosN and PosQ combining PosN and PosQ.

The NQ combining demodulation method will be described referring to FIG. 10 to FIG. 12. FIG. 10 shows the position information PosN and PosQ calculated by the adders 42 and 44 in FIG. 9. In the NQ combining demodulation, position demodulation is performed not by selecting one of these but by using both.

As FIG. 10 shows, in a conventional demodulation method, one of PosN and PosQ, whichever absolute value is smaller, is selected as the demodulation position. In the NQ combining demodulation method, positions are demodulated using the bold line 84 for PosQ and bold lines 86 and 88 for PosN in a same block.

FIG. 12 is a characteristic diagram when positions are demodulated using PosN and PosQ in FIG. 10 respectively, where the ordinate is the demodulated detection position and the abscissa is the actual position. Here, in the ordinate, the position sensitivity gain, including an error, is indicated by k, and the detection (demodulation) position by kx. If the position sensitivity gain is a correct value, the linear characteristic detection positions in the line 90, without the step differences caused by switching PosN and PosQ as seen in prior art, can be obtained.

If the position sensitivity gain has an error, PosQ exhibits the characteristic of line 90, and PosN exhibits the characteristic of lines 92 and 95 with the above mentioned bold line block as the center. Therefore if PosN and PosQ are switched as in prior art, a switching step difference is generated when PosN crosses over to PosQ (−0.25) and when PosQ crosses over to PosN (+0.25).

To eliminate this switching step difference, the NQ combining demodulation method modulates the positions by combining PosN and PosQ, and the principle thereof will be described. The characteristics of line 90 and line 92 are expressed as follows with formulas ya and yb, where the ordinate is y.

$$ya = kx \tag{7}$$

$$yb = k(x-0.5)+0.5 \tag{8}$$

It is ideal that the demodulation (detection) position y, with respect to the actual position x, has the relationship y=x, even if the value of the position sensitivity gain k has an error. So by combining the two lines 90 and 92, a line without the step difference shown by the broken line 94 is determined.

By this, using the weight gain M, the demodulation position ya is multiplied by the weight gain M, the demodulation position yb is multiplied by the demodulation gain (1−M), and both results are combined. In other words, the following formula (9) is calculated.

$$y = Mkx + (1-M)(k(x-0.5)+0.5) = \\ 0.5(k-1)M + kx - 0.5(k-1) \tag{9}$$

Here to prevent the influence of the position sensitivity gain k on the formula (9), the demodulation position kx must be matched with the actual position x, so the gain M is calculated as follows using formula (9).

$$x = 0.5(k-1)M + kx - 0.5(k-1) \ 0.5(k-1)M = -(k-1)x + \\ 0.5(k-1) \therefore M = -2x+1 \tag{10}$$

In other words, the weight gain M must be a linear function of the actual position x.

Here the line 92 at the plus side with respect to the line 90 in FIG. 12 was discussed, but in the same way, the weight gain M for the relationship with the line 95 at the minus side is given by the following formula.

$$M = 2x+1 \tag{11}$$

And by determining the absolute value of the actual position x, the formulas (10) and (11) can be integrated into formula (12).

$$M = -2|x|+1 \tag{12}$$

FIG. 11 is a diagram depicting this weight function. Here the weight function M is a function of the actual position x, so the influence of the position sensitivity gain k is not included in formula (12). However, the position which can be actually detected is only the detection position kx. The influence by the position sensitivity gain k includes an error which appears most clearly in an area around the switching boundary of PosN and PosQ, that is ±0.25 in FIG. 12. In this switching boundary, a value close to M=0.5 must be used to obtain the line 94, without a step difference, as shown in FIG. 12.

However, M is not M=0.5 at the boundary, since y=kx, instead of y=x, is used for the calculation of the weight gain. So a condition where M<0.5 is regarded as M=0.5 is added to the formula (12). FIG. 11 shows the weight function M, where the lower limit value of the weight function is regarded as 0.5 when y=kx is used.

Referring to FIG. 9 again, the weight function in FIG. 11 is stored in the weight function table 70. The demodulation section 52 compares the absolute values abs of PosN and PosQ, and calculates Pos1 and Pos2 according to the comparison result. This is given by the following formulas.

When abs (PosN)≦abs (PosQ), $$\text{Pos1} = -\text{sgn}(\text{Pos}Q)*\text{Pos}N + \text{Vel}*T1/Ts \tag{13}$$

$$\text{Pos2} = \text{sgn}(\text{Pos}N)*(\text{Pos}Q - \text{sgn}(\text{Pos}Q)*0.5) + \text{Vel}*T2/Ts \tag{14}$$

When abs (PosN) is not≦abs (PosQ), $$\text{Pos1} = \text{sgn}(\text{Pos}N)*\text{Pos}Q + \text{Vel}*T2/Ts \tag{15}$$

$$\text{Pos2} = -\text{sgn}(\text{Pos}Q)*(\text{Pos}N - \text{sgn}(\text{Pos}N)*0.5) + \text{Vel}*T1/Ts \tag{16}$$

Vel*T2/Ts and Vel*T1/Ts are the above mentioned velocity offset values. Then referring to the weight function table 70 with Pos1 (=kx), the weight functions M and 1−M are obtained. The multiplier 72 multiplies Pos1 by M. And the multiplier 74 multiplies Pos2 by (1−M).

The position demodulation section 68 adds the offset (difference between the positions of the read and write elements) and the corrected positions Pos1 and Pos2 to the demodulated track numbers, subtracts the position orbit obtained from the virtual circular orbit table 62, and outputs the demodulation positions.

Now a method for calculation by a C language program will be explained. It is assumed that the gain T1/Ts of the velocity offset is added for modulation with PosN, and T2/Ts is added for modulation with PosQ. If the velocity at this time is Vel and the maximum velocity at which the phase relationship of PosN and PosQ does not reverse is VEL_MAX, then the positions can be calculated as follows.

```
      PosN = Gsns* (PosA - PosB) ;
      PosQ = Gsns* (PosC - PosD) ;
   Track = Gray;
      Position = Track;
      If (abs (Vel) < = MAX_VEL) {
if (abs (PosN) < = abs (PosQ) {
         PosOfs = - sgn (PosQ) *PosN + Vel*T1/Ts;
         if (sgn (PosQ)*even (Track) > 0.0)
            Potition + = sgn (PosQ) *sgn (PosN) *1.0;
         PosOfs2 = sgn (PosN) *PosQ - sgn (PosQ) *0.5 +
                                                    Vel *
T2/Ts;
      } else {
         PosOfs = sgn (PosN) *PosQ PosN + Vel*T2/Ts;
         Position = sgn (PosN) *even (Track) *0.5 +Track;
         PosOfs2 = - sgn (PosQ) * (PosN - sgn
         (PosN) *0.5)
+
                                                    Vel*
T1/Ts;
      }
      G1 = M (PosOfs);
      G2 = 1 - G1;
      Position + = G1*PosOfs + G2*PosOfs2;
   }
```

In this way, the step difference, which is generated by demodulating crossing over the demodulation boundary of PosN and PosQ, is solved by using the NQ combining demodulation method, which demodulates by multiplying PosN and PosQ by the weight gain, constantly adding the result. Also by including the velocity offset correction of NQ, position error deterioration in the virtual circular control of the area demodulation method can be avoided.

EXAMPLES

To prove the effect of the present invention, an example when an actual experiment was performed with a 2.5 inch HDD will now be described. This hard disk drive (HDD) is a device where the rotation frequency of the disk is 4200 rpm, and the track pitch of the disk is 61500 TPI. FIG. 13 to FIG. 16 show the experiment result.

In this device, servo signals are recorded on a disk in advance by an external STW device, and the disk is then assembled as an HDD. Therefore eccentricity exists from the beginning. In a state where the head is following up tracks on the disk, correction current required for following up the eccentricity is flowing, and the current oscillates in a sinusoidal manner.

Here a sinusoidal position orbit is added to check the problem of virtual circular control. As the above diagram on the principle shows, normal position demodulation is performed, and then the sinusoidal position orbit is subtracted. The status change is observed while changing the amplitude of the position orbit at this time. The final goal is to decrease the current of the actuator to "0". But in this case, the actuator is intentionally oscillated to observe the influence on position demodulation. Therefore current does not become "0".

Figure 13:
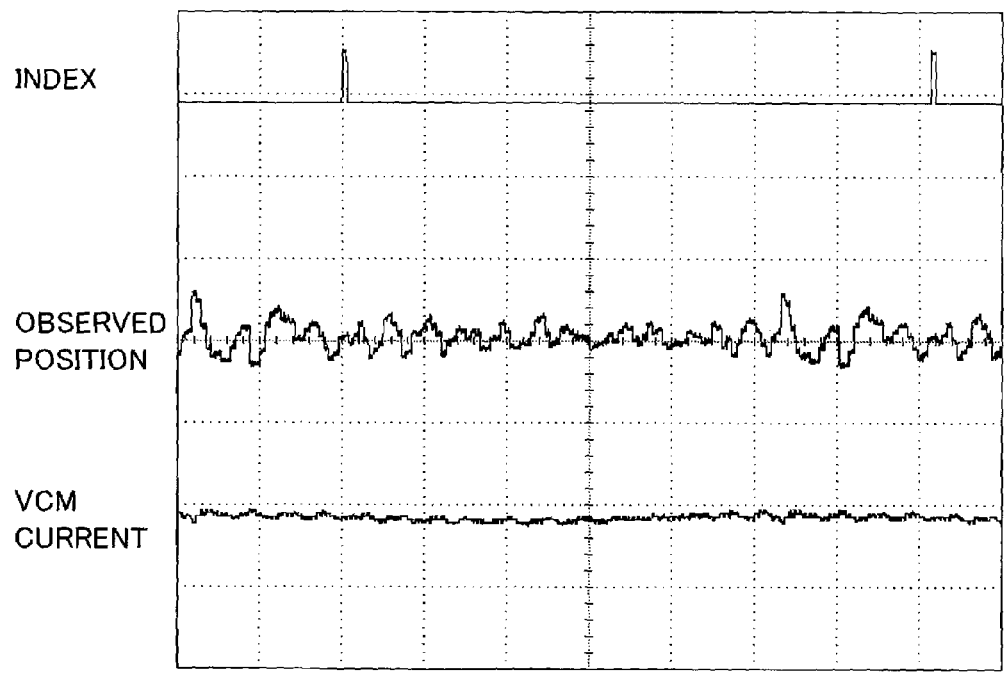
FIG. 13 is a diagram depicting an experiment example when the virtual circular control of the comparison example is not executed.

FIG. 13 is a comparison example, where the index signal, the observation position (position error signal) and VCM current when the sinusoidal position orbit has a ±0 track amplitude, that is when virtual circular control is not performed, are shown on a time axis. Since the observation positions are equalized, the RPE (Repeatable Position Error) is seen.

Figure 14:
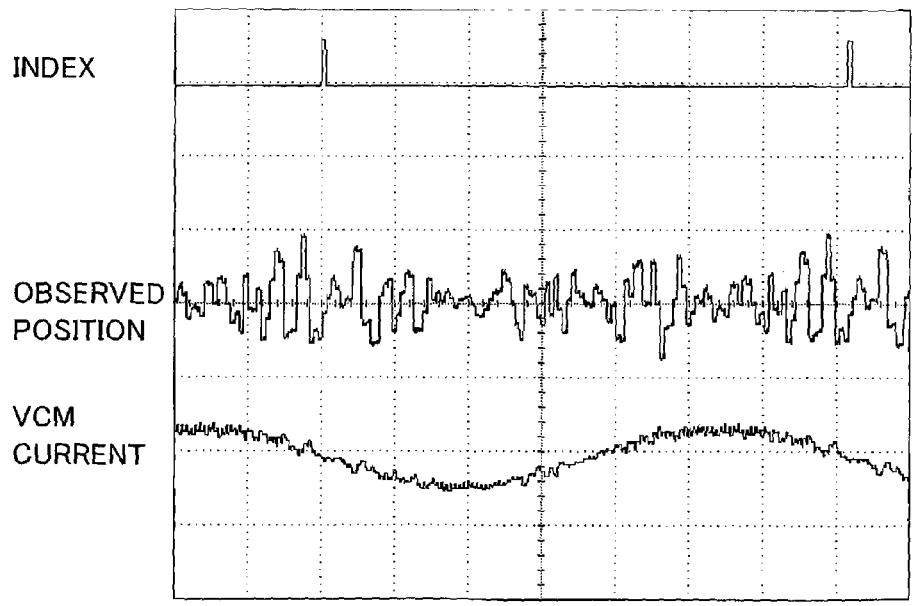
FIG. 14 is a diagram depicting an experiment example when the virtual circular control of the comparison example is executed and the velocity offset correction is not executed.

FIG. 14 shows another comparison example apart from FIG. 13, where the index signal, the observation position (position error signal) and the VCM current when a ±64 track position orbit is provided as the sinusoidal orbit (virtual circular control is performed), are shown on a time axis. Positioning accuracy clearly decreases. This is largely because velocity offset correction is not performed, and also because demodulation is performed crossing over the demodulation boundary between PosN and PosQ.

Figure 15:
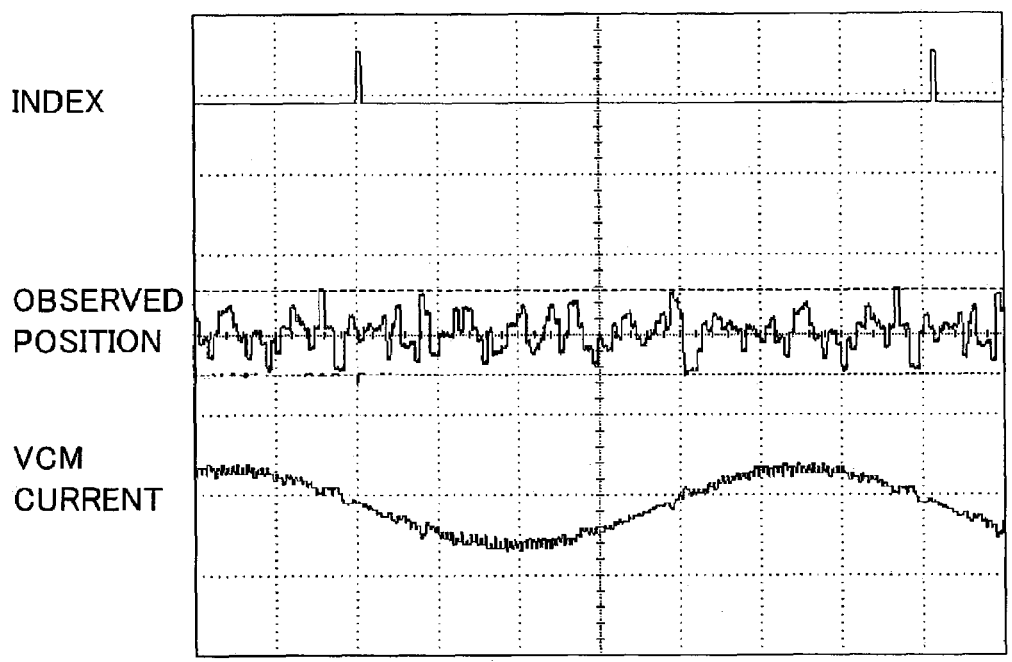
FIG. 15 is a diagram depicting an experiment example when the velocity offset correction in the virtual circular control according to the present invention is executed.

FIG. 15 is an example where the index signal, observation position and VCM current, when NQ velocity offset correction and NQ combining demodulation are performed in the virtual circular control in FIG. 14, are shown on a time axis. Even if a ±64 track position orbit is provided and virtual circular control is performed, the position error clearly decreases in comparison with the above example shown in FIG. 14. In this way, by adding NQ velocity offset correction along with NQ combining demodulation, positional error deterioration in virtual circular control of an area demodulation method can be avoided.

Figure 16:
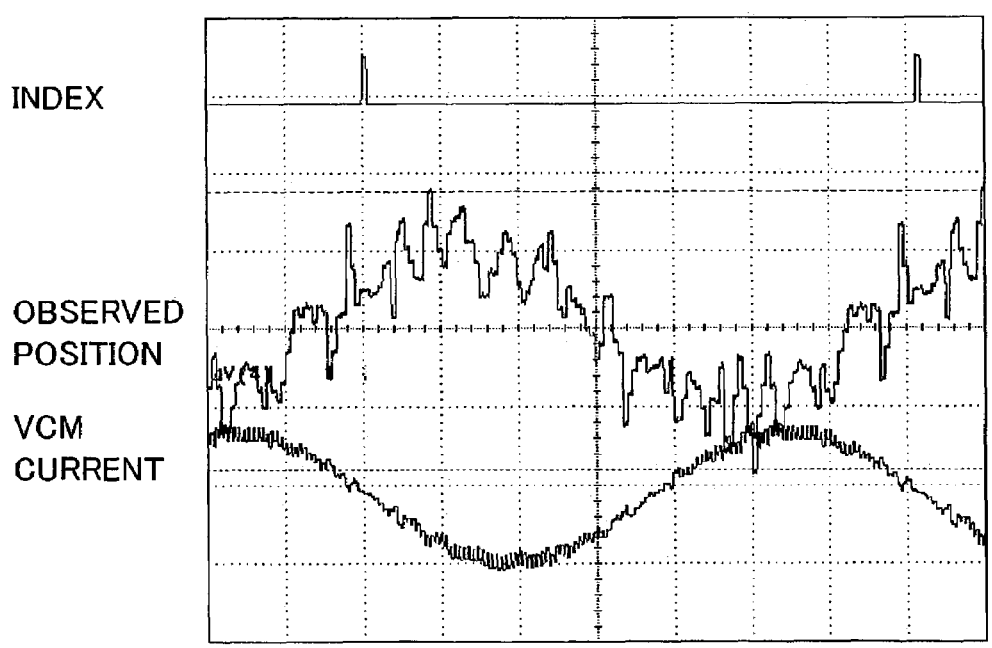
FIG. 16 is a diagram depicting an experiment example of the critical velocity when the velocity offset correction in the virtual circular control according to the present invention is executed.

FIG. 16 is the example result when the position orbit amplitude is increased up to ±128 tracks in the virtual circular control in FIG. 15. The position error is not 0, and it oscillates. This problem occurs because the velocity, due to the position orbit, is too high and a block, where the phase relationship between PosN and PosQ is reversed, is generated, as described in the above mentioned application (Japanese Patent Laid-Open No. 2001-256741). In such a status, the problem cannot be solved regardless how NQ velocity offset correction is performed.

In this way, in the use of a virtual circular control using an area demodulation type method, the critical velocity at which the phase relationship between PosN and PosQ does not reverse determines the upper limit of the position orbit amplitude of the virtual circular control.

[Servo Track Write Methods]

Now how to use a disk device which can avoid the influence of the step difference of the demodulation boundary of PosN and PosQ and the influence of the velocity offset of PosN and PosQ in this way will be described.

The first method is the same as using a regular HDD device. When servo signals have been recorded on the disk alone by an external STW device, one or a plurality of such disks are mounted on the HDD device. In this case, the problems lies in the difference of eccentricity of the disks.

To solve this difference, the technology of virtual circular control, described in the present patent application, is used, then the influence of the eccentricity difference between the heads and between the disks can be avoided. If virtual circular control is not used, the moving distance of the actuator when the head is switched differs depending on the position of the head in the circumference direction. By using the virtual circular control of the present patent application, this problem can be solved.

Figure 17:
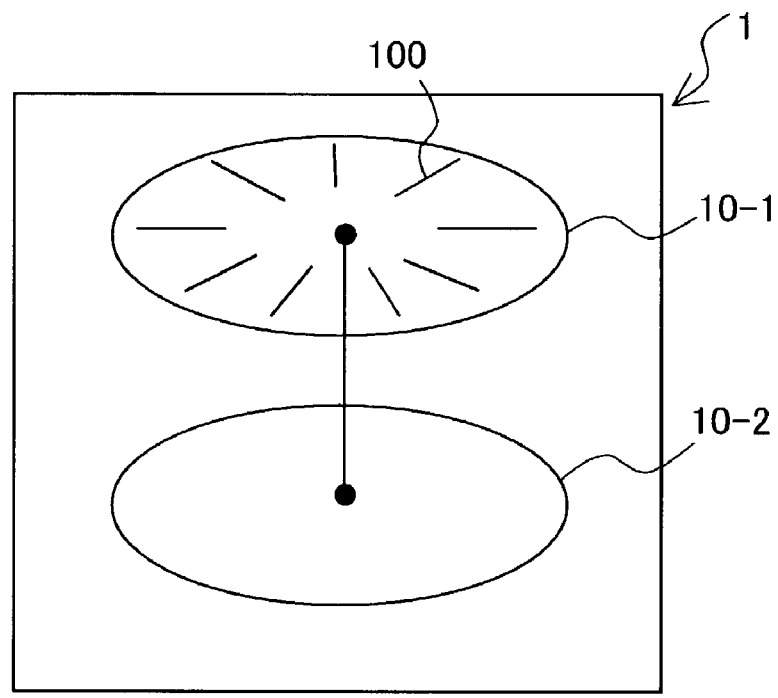
FIG. 17 is a diagram depicting an embodiment of the servo track write method according to the present invention.
Figure 17:
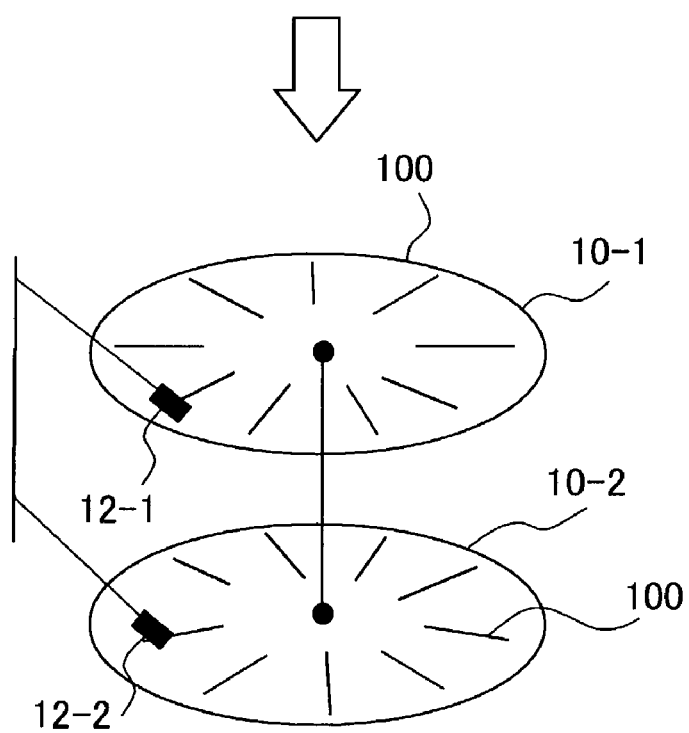
Figure 18:
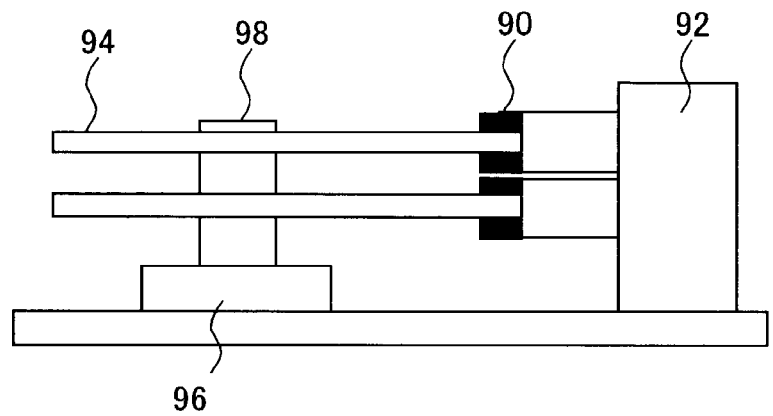
FIG. 18 is a diagram depicting a configuration of a conventional magnetic disk device.
Figure 19:
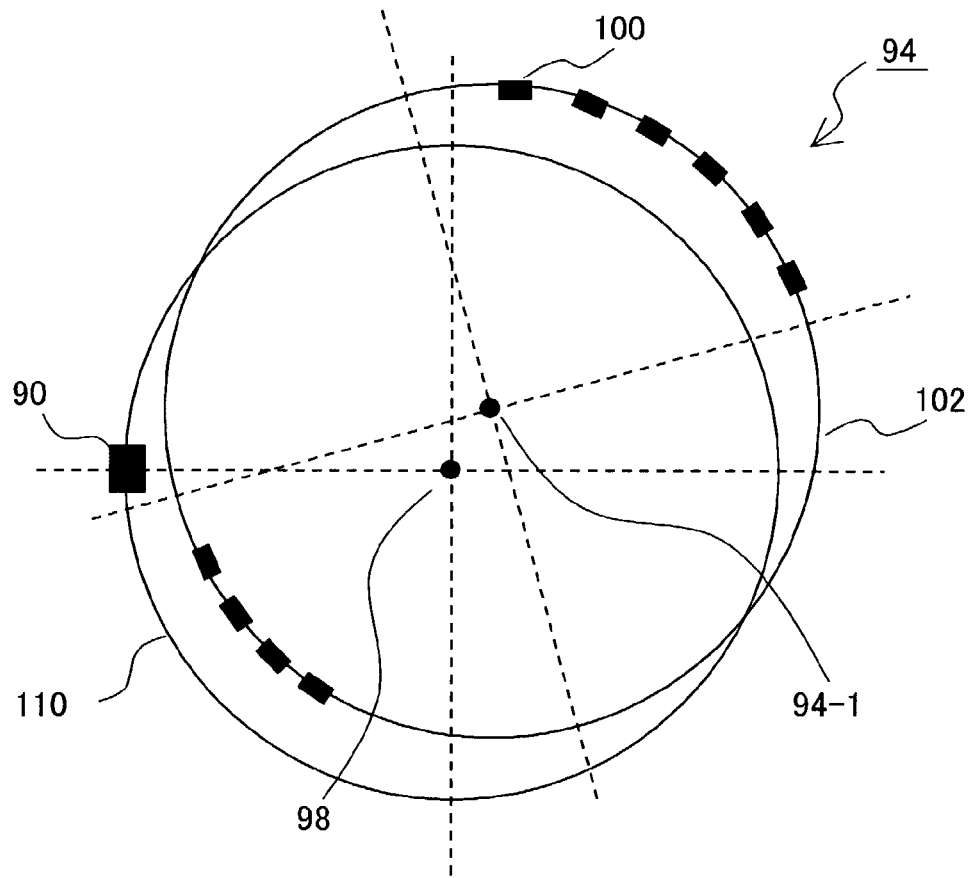
FIG. 19 is a diagram depicting a conventional virtual circular control.
Figure 20:
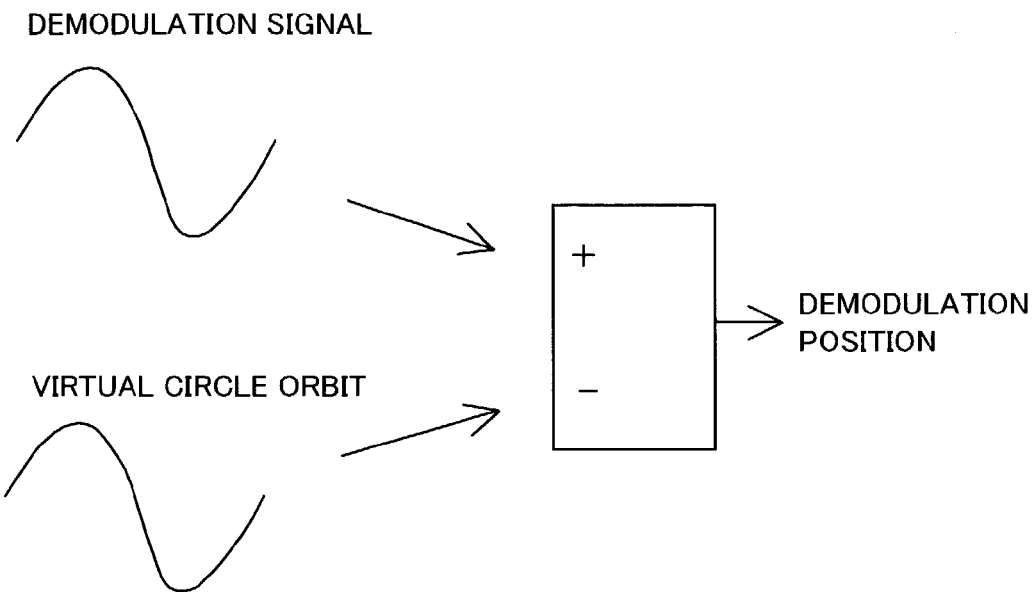
FIG. 20 is a diagram depicting a conventional position demodulation method at virtual circular control.
Figure 21:
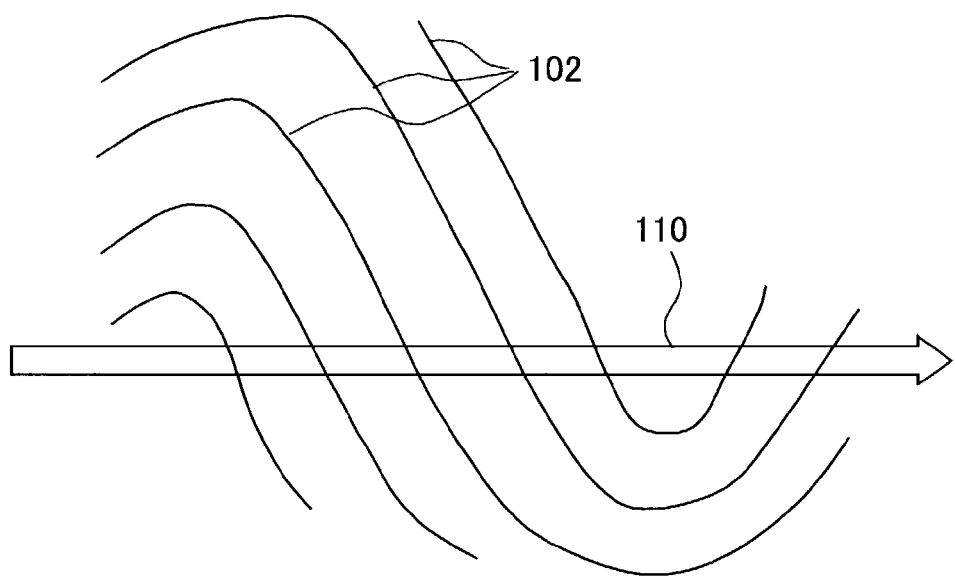
FIG. 21 is a diagram depicting the relationship between the servo signal orbit and the virtual circular orbit in the virtual circular control.

The second method is using STW itself. FIG. 17 is a diagram depicting the servo track write method of the present invention. In an external STW device, servo signals are recorded on the disk. And one such disk 10-1 is mounted on the disk device 1. Then a plurality of disks 10-1, where no servo signals have been recorded, are mounted on the disk device 1.

Then the positioning control of the head 12-1 is performed on the disk face 10-1 where servo signals have been recorded using virtual circular control so as not to follow up the eccentricity. And the new servo signals are recorded on all the disks 10-1 and 10-2, in the areas between the original servo signals of the disk 10-1 for all the heads, 12-1 and 12-2. Finally, while positioning is performed using the newly recorded servo signals, the original servo signals of the original disk 10-1 are erased.

In this way, using a disk where servo signals have been recorded outside, servo signals can be recorded on all the disks from these servo signals without eccentricity. In this case, virtual circular control is used only for servo track write, and after servo track write, demodulation is performed with normal servo signals without virtual circular control, and with this method, the head position is controlled.

[Other Embodiments]

A disk storage device has been described using a magnetic disk device, but the present invention can be applied to other disk storage devices, such as an optical disk device and a magneto optical disk device. The correction method of the head during switching is not limited to two or more disks, but can be applied between heads used for the front and back of one disk. The shape of the disk is also not limited to a disk shape, but may be a card shape.

The present invention has been described with embodiments, but various modifications are possible in the scope of the essential character of the present invention, which shall not be excluded from the technical scope of the present invention.

As described above, the velocity offset correction of 2-phase signals is performed with both the head velocity of the virtual circular orbit reference and the relative velocity of the virtual circular orbit and the position signals, so head position control at higher precision is possible even if virtual circular orbit control is performed. Therefore, even if the track pitch of the disk becomes narrower and the number of eccentric tracks increases, virtual circular orbit control at higher precision can be performed, and the read/write performance can be improved.

Since the demodulation boundary step difference between PosN and PosQ is solved by including a combining demodulation method, positioning control at higher precision can be implemented.

What is claimed is:

1. A head position control method for controlling a position of a head on a virtual circular orbit of a disk, comprising the steps of:
    demodulating a position signal of said disk read by said head;
    calculating a demodulation position from said demodulation result;
    subtracting the positional oscillation caused by the eccentricity of said disk from said demodulation position;
    calculating the control amount according to the positional error between said demodulation position after subtraction and the target position; and
    controlling an actuator for driving said head by said control amount,
    wherein said calculation step comprises a step of correcting said demodulation result with a correction value according to the velocity of a virtual circular orbit reference of said head and the relative velocity of said virtual circular orbit and the position signal of said disk and calculating said demodulation position.

2. The head position control method according to claim 1, wherein said demodulation step comprises a step of demodulating a first position information and a second position information, of which phases are mutually different, from said position signal by the area demodulation.

3. The head position control method according to claim 2, wherein said calculation step comprises a step of calculating said demodulation position by combining said first position information and said second position information with predetermined weights.

4. The head position control method according to claim 3, wherein said calculation step comprises a step of calculating said demodulation position by multiplying said first position information by a predetermined weight M, multiplying said second position information by another predetermined weight (1−M), and combining these multiplication results.

5. The head position control method according to claim 2, wherein said calculation step comprises a step of correcting said first position information with a first correction value according to the velocity of said virtual circular orbit reference of said head and the relative velocity of said virtual circular orbit and the position signal of said disk, and correcting said second position information with a second correction value according to the velocity of said virtual circular orbit reference of said head and the relative velocity of said virtual circular orbit and the position signal of said disk.

6. The head position control method according to claim 1, further comprising a step of calculating said relative velocity by differentiating a virtual circular position orbit for subtracting said positional oscillation.

7. A disk device for controlling a position of a head on a virtual circular orbit of a disk, comprising:
    a head for reading a position signal of said disk;
    an actuator for driving said head; and
    a control unit which demodulates a position signal from said head and controls said actuator for driving said head,
    wherein said control unit corrects said demodulation result with a correction value according to a velocity of a virtual circular orbit reference of said head and a relative velocity of said virtual circular orbit and position signal of said disk, calculates a demodulation position, subtracts positional oscillation caused by the eccentricity of said disk from said demodulation position, and calculates the control amount of said actuator according to the positional error between said demodulation position after subtraction and the target position.

8. The disk device according to claim 7, wherein said control unit demodulates a first position information and a second position information, of which phases are mutually different, from said position signal by the area demodulation.

9. The disk device according to claim 8, wherein said control unit calculates said demodulation position by combining said first position information and said second position information with predetermined weights.

10. The disk device according to claim 8, wherein said control unit corrects said first position information with a first correction value according to the velocity of said virtual circular orbit reference of said head and the relative velocity of said virtual circular orbit and the position signal of said disk, and correcting said second position information with a second correction value according to the velocity of said virtual circular orbit reference of said head and the relative velocity of said virtual circular orbit and the position signal of said disk.

11. The disk device according to claim 8, wherein said control unit calculates said demodulation position by multiplying said first position information by a predetermined weight M, multiplying said second position information by another predetermined weight (1−M), and combining these multiplication results.

12. The disk device according to claim 7, wherein said control unit has a table for storing said positional oscillation to be subtracted, and calculates said relative velocity by differentiating a positional oscillation of said table.

13. A servo track write method for writing a position signal to a mounted disk, comprising the steps of:
  demodulating a position signal of said disk read by a head;
  calculating a demodulation position from said demodulation result;
  subtracting positional oscillation caused by eccentricity of said disk from said demodulation position;
  calculating the control amount according to the positional error between said demodulation position after subtraction and the target position; and
  controlling an actuator for driving said head,
  wherein said calculation step comprises a step of calculating said demodulation position by correcting said demodulation result with a correction value according to the velocity of a virtual circular orbit reference of said head and the relative velocity of said virtual circular orbit and the position signal of said disk;
  and wherein said servo track write method further comprises a step of rewriting said position signal along the virtual circular orbit of said head.

14. The servo track write method according to claim 13, wherein said demodulation step comprises a step of demodulating a position signal of said disk where said position signals have been written outside the device where said disk is mounted.

* * * * *